April 2, 1968 L. H. TURNER ET AL 3,375,780

SHEET COUNTING MECHANISM FOR REPRODUCTION MACHINES

Filed Sept. 30, 1965 13 Sheets-Sheet 1

INVENTORS
LYMAN H. TURNER
JAMES R. CASSANO

BY [signature]

ATTORNEYS

INVENTORS
LYMAN H. TURNER
JAMES R. CASSANO

BY [signature]

ATTORNEYS

INVENTORS
LYMAN H. TURNER
JAMES R. CASSANO
BY
ATTORNEYS

SHEET COUNTING MECHANISM FOR REPRODUCTION MACHINES

Filed Sept. 30, 1965

INVENTORS
LYMAN H. TURNER
JAMES R. CASSANO
BY
ATTORNEYS

INVENTORS
LYMAN H. TURNER
JAMES R. CASSANO
BY
ATTORNEYS

INVENTORS
LYMAN H. TURNER
JAMES R. CASSANO
BY
ATTORNEYS

INVENTORS
LYMAN H. TURNER
JAMES R. CASSANO
BY
ATTORNEYS

SHEET COUNTING MECHANISM FOR REPRODUCTION MACHINES

Filed Sept. 30, 1965

INVENTORS
LYMAN H. TURNER
JAMES R. CASSANO
BY
ATTORNEYS

INVENTORS
LYMAN H. TURNER
JAMES R. CASSANO
BY
ATTORNEYS

INVENTORS
LYMAN H. TURNER
JAMES R. CASSANO
BY
ATTORNEYS

INVENTORS
LYMAN H. TURNER
JAMES R. CASSANO
BY
ATTORNEYS

INVENTORS
LYMAN H. TURNER
JAMES R. CASSANO
BY
ATTORNEYS

INVENTORS
LYMAN H. TURNER
JAMES R. CASSANO
BY
ATTORNEYS

United States Patent Office 3,375,780

Patented Apr. 2, 1968

3,375,780

SHEET COUNTING MECHANISM FOR REPRODUCTION MACHINES

Lyman H. Turner, Pittsford, and James R. Cassano, Rochester, N.Y., assignors to Xerox Corporation, Rochester, N.Y., a corporation of New York Filed Sept. 30, 1965, Ser. No. 491,553

3 Claims. (Cl. 101—132)

ABSTRACT OF THE DISCLOSURE

A reproduction apparatus of the pressure-transfer type incorporating a three-way roller bearing support for the rotatable copy drum and driving pressure roll, toggle type force generating means for holding the pressure roll in pressure contact with the copy drum, a foldable paper tray, automatic gripping means for attaching the transfer sheet to the copy drum, means for separating copies from the transfer sheet, and programming control means adapted at the last copy programmed to release the gripping means whereby the transfer sheet is expelled with the last copy.

The present invention relates to reproduction machines and more particularly to means for presetting and counting the number of copies to be produced on a reproduction machine.

Generally, reproduction machines of the pressure-transfer configuration, which is particularly suitable as an environment for the present invention, are of two broad types. One type, known as a spirit duplicator, requires a copying fluid or spirit which moistens each copy sheet as it passes between a rotatable platen which supports a master or transfer sheet and a pressure roller. The spirit dissolves some of the dye on the master sheet, and the resultant dissolved dyestuff is transferred to the copy sheet as it is transported between the rollers.

Another type of pressure-transfer duplicating equipment combines the effect of heat and pressure to effect transfer from a transfer sheet to a copy sheet. This type of equipment may take various forms and materials such as the use of fixing compositions for the dyes imprinted upon the master sheet wherein heat is utilized to cause or enhance reaction between the dye and the fixing composition. Special circuits and temperature control devices are provided in these duplicating machines for insuring optimum transfer conditions.

Significantly, the present invention takes on added importance in that it may be devised for use in a reproduction machine having compact size, requiring a minimum of operative steps, and which may be quickly brought into operation by the mere push of a button. With these advantages, the machine incorporating the invention is particularly useful as a companion machine to the conventional typewriter, to be made a part of or an adjacent neighbor thereto and serve to eliminate the need to make carbon copies by use of the typewriter. In fact, the machine incorporating the present invention derives its most useful benefit in that duplication of a typed original document may be accomplished solely by the machine, thus eliminating the cumbersome application of the carbon paper to the typewriter and the burdensome manipulation of the carbon sheets in order to effect erasures of the carbon sheets and corrections to the original.

It is a principal object of the present invention to improve office duplicating machines for general copying use by utilizing a copy counting mechanism which is composed of simple, economical and easily fabricated parts.

Another object of the invention is to utilize a presettable mechanism which may be manipulated to control operation of the machine by means of the number of copies produced.

Still another object of the invention is to insure accurate counting of the copies being made in an office duplicating machine wherein a master copy must be made on the machine just previous to the making of the copy sheets.

In order to accomplish these and other objects of the invention, there is provided a presettable copy sheet counting mechanism in a duplicating machine of the type which operates under a dry process requiring merely the application of pressure in order to effect transfer of information on an original document to ordinary copy paper. Any other suitable reproduction machine may be utilized to practice the present invention. The duplicating machine that will be described in association with the present invention comprises a rotatable drum for supporting therearound a transfer sheet for moving first an original document therewith and then a sheet of copy paper. A roller is also provided and is arranged to be in pressure contact with the drum by means of a toggle-joint force producing mechanism for effecting ink transfer. Each revolution of the drum is adapted to complete one reproduction of the original document, and a counter mechanism is set into motion in cooperation with a programmer device in order to register individual copies being produced. There are included in the machine means for driving the drum, guide means and registering means for insuring accurate feeding and movement of the various sheets into and through the machine, and paper clamping devices, under control of the programmer device, for controlling the movement or release of the sheets.

Further objects and advantages will become apparent after reading the following description when taken in conjunction with the accompanying drawings, wherein.

Figure 1:
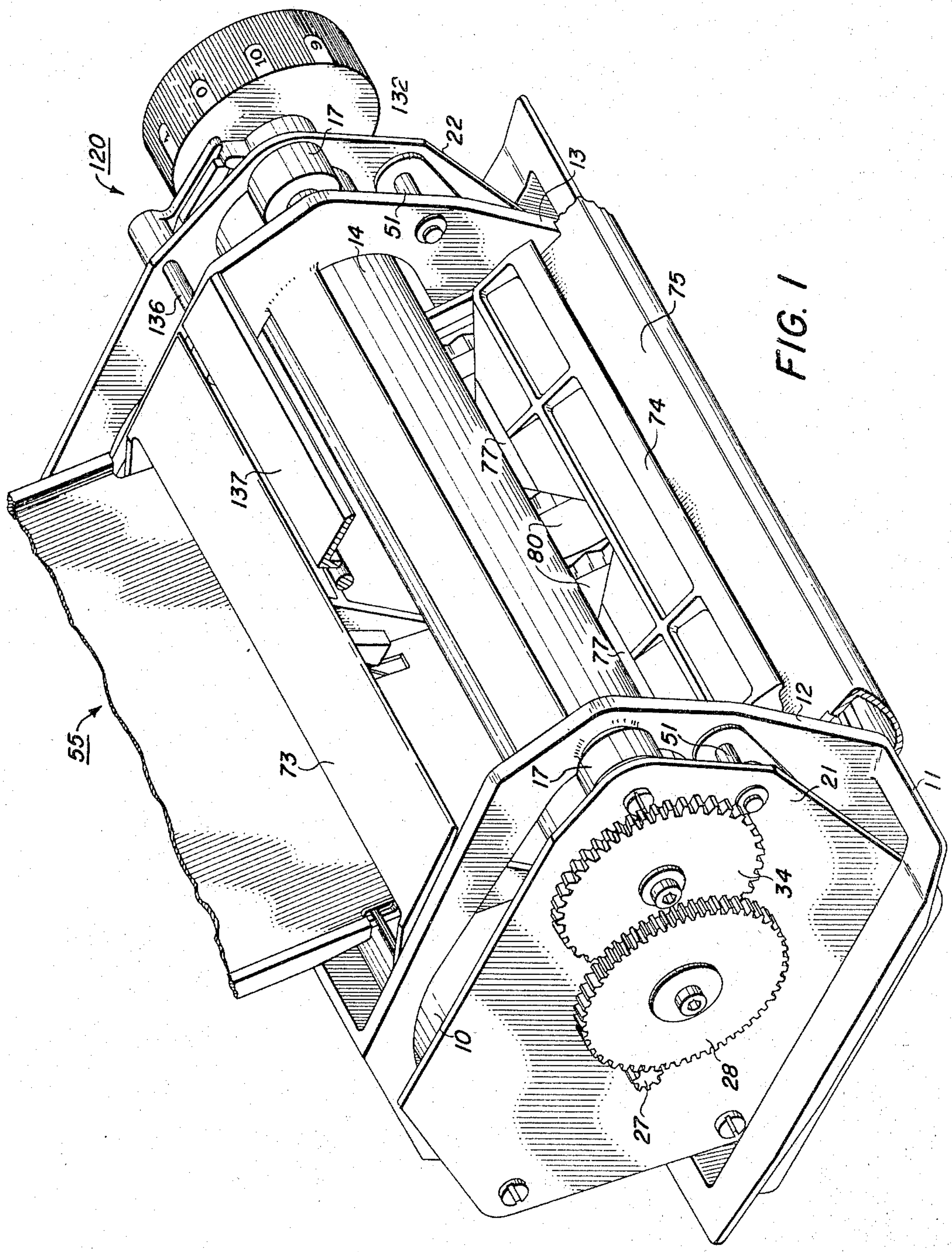
FIG. 1 is an isometric view of the reproduction machine which embodies the present invention.

The duplicating machine to be described herein is particularly adapted for printing out copies on ordinary copy paper by means of a pressure transfer process involving a master or transfer sheet material produced as the first operative step in the use of the duplicating machine or of any particular run of the machine. The master or transfer sheet, in turn, derives or acquires the information to be reproduced from an original produced independently of the duplicating machine, such for example, by typing with a conventional typewriter.

In order to devise a transfer sheet that is usable with the present machine, the ink or pigment presented upon the transfer sheet must be transferable by the application of relatively high pressure. Production of the transfer sheet may be accomplished by two methods:

(a) The direct method wherein the transfer sheet is typed along with the original and a sheet of special carbon paper is positioned behind the transfer sheet with the carbon ink facing the master, and (b) The indirect method wherein the informational image is formed by typing with a special typing ribbon onto the original from which the image is transferred to a transfer sheet under pressure. The present duplication machine is adapted to accommodate a transfer sheet produced by either method; however, it is preferred that the indirect method be employed since this method would not involve the added manipulative steps with a typewriter, that is, arranging an original, a carbon sheet and transfer sheet material in a typewriter and insuring adequate alignment of these sheets relative to one another. Essentially, the indirect method involves single-sheet typing.

In the direct method, the master sheet is generally made of wax paper which may be wax coated base stock paper, whereas in the direct method, the transfer sheet need not be wax coated. The ink formulation for either the ribbon in the indirect method or the carbon paper in the direct may include a small percentage of wax; a large percentage of pigment, usually iron oxide or carbon pigment; and a modifier, such as petroleum and chlorinated rubber, which serves as a binder.

In producing a transfer sheet by the indirect method, the ink from the typewriter ribbon is transferred to the original sheet by the striking of each typewriter key, as is the case with single copy typing. The typed original is usable as such and may be mailed or routinely handled as an ordinary typed ribbon copy. Reproductions of the original can be made by means of the present machine in view of the fact that a portion of the ink on the original will be transferred to the transfer sheet materials by the application of pressure. To reproduce copies, the original sheet and a transfer sheet are aligned in the feed tray with the typed copy in contact with the coated surface of the transfer sheet and fed into the machine incorporating the present invention wherein high pressure is applied as the sheets are rolled through the pressure area in the machine. This action transfers the ink from the original to the transfer sheet. The transfer sheet is retained in the machine while the original is fed out. To make copies, a sheet of ordinary copy paper is placed in the feed tray where it is automatically registered with the copy on the transfer sheet and then rolled through the pressure area of the machine. With the application of pressure, some of the ink is transferred from the transfer sheet to the copy sheet. This step may be repeated in order to produce any number of copy sheets, for example, ten copies or more, depending upon the ink depth and the porosity of the papers utilized.

Figure 2:
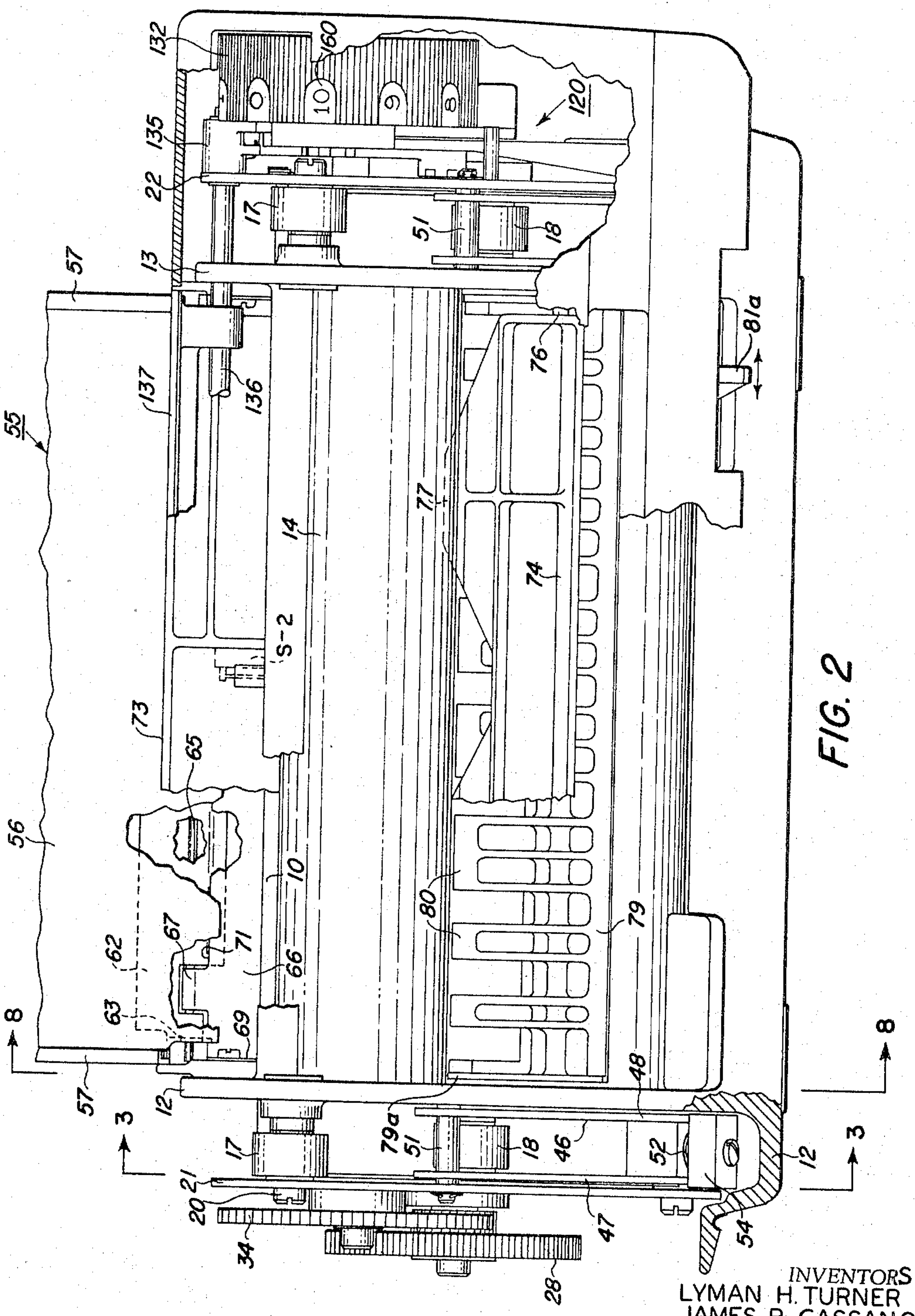
FIG. 2 is a front elevational view of the machine partly in section with other parts broken away.

Referring to FIGS. 1 and 2, the duplicating machine embodying the present invention includes a drum 10 mounted for rotation on a base casting 11 having vertically extending left-hand and right-hand side plates 12 and 13 spaced inwardly a slight distance from the respective ends of the base. Also mounted for rotation on the base 11 is a pressure roller 14 having its internal diameter in the center area thereof slightly larger than at the ends and tapering between the center area and the ends thus providing a crown roller configuration.

Figure 3:
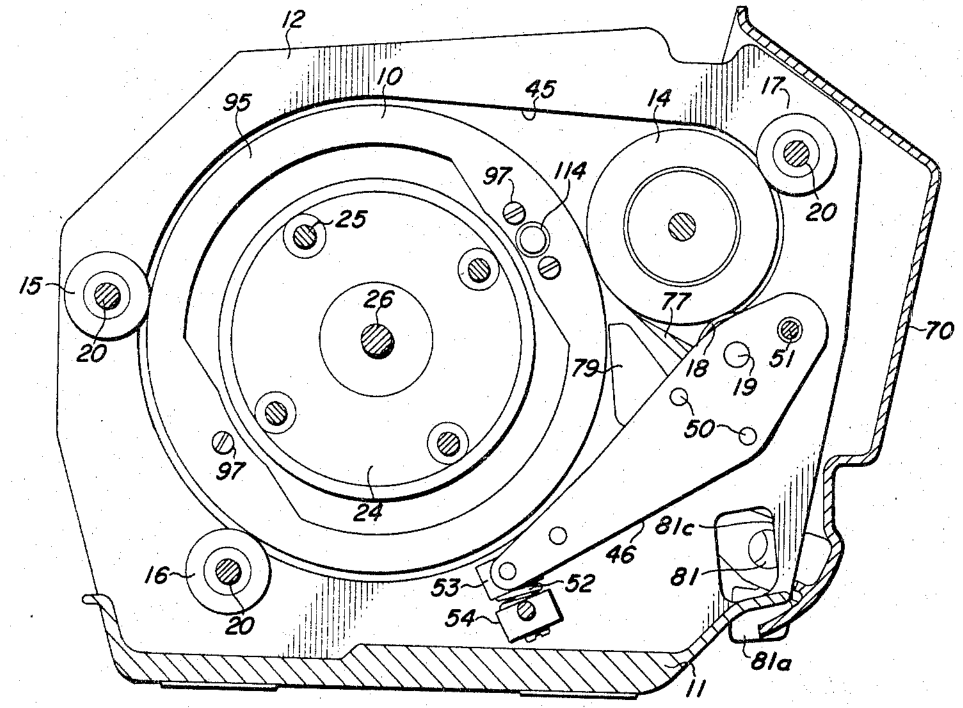
FIG. 3 is a sectional view of the machine taken along the line 3—3 in FIG. 2 and showing a force generating mechanism utilized for exerting pressure between the copy drum and the pressure roller.

As shown in FIG. 3, which illustrates the one end of the drum 10 and the roller 14 and their supporting structure and which is similar to the other end, the drum and the pressure roller are confined and supported for rotation on three bearing rollers 15, 16 and 17 arranged at the apexes of an isoceles triangle, and a fourth roller bearing 18 rotatably supported on a pivot pin 19 and arranged for limited movement. The bearing rollers 15, 16 and 17 are arranged in similar fashion at both ends of the base 11 and are each rotatably mounted by fixed pins 20 secured to and between the side plate 12 and an end plate 21 at the left end of the machine, as viewed in FIG. 2, and between the side plate 13 and an end plate 22 at the right-hand end. The fourth bearing roller 18 is mounted on a lever system and biased into engagement with the pressure roller 14. Further details of the roller and drum supporting arrangement will be described hereinafter in the description of the force generating mechanism for the roller 14.

Figure 4:
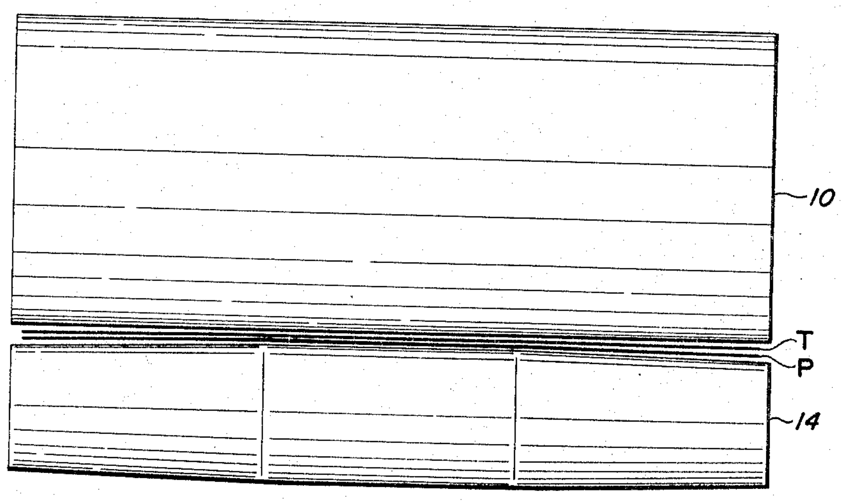
FIG. 4 is a schematic view of the drum and pressure roller in peripheral contact to emphasize the crowned configuration of the roller.

In FIG. 4, the crown configuration of the pressure roller 14 is shown schematically in relation to the drum. The tapered diameter from the center area, which is relatively flat toward the ends of the roller, as shown, are exaggerated in order to facilitate description. Good results have been attained from a configuration wherein each tapered end of the roller is approximately one-third of the length of the roller as is the center area, and the difference in diameter between the ends and the center area is one or two thousandths of an inch for a two-inch diameter roller.

In operation of the machine, during transfer there is a sheet of paper and a transfer sheet between the roller and the drum. Extremely high linear pressure or force will exist along the linear contact of the roller and the drum with the paper and the transfer sheet therebetween as transmitted by the supporting rollers 15, 16, 17 and 18. Because the paper and transfer sheet are compressible and also because the supporting rollers 15, 16, 17 and 18 are beyond the edges of the paper and the transfer sheet, the roller will be deflected; and if the pressure roller were of straight configuration instead of crown, the pressure at the ends of the linear contact would be greater than at the center. The effect of this condition would be the production of copies that were darker at the edge portions of the sheet and lighter in the middle area. In addition, this uneven pressure axially along the drum produces a component of force which runs axially inwardly along the linear contact, and this component of force will result in the sheet being processed becoming wrinkled and creased out of shape.

With the provision of a crowned configuration to the pressure roller, the deflection of the roller caused by the extremely high pressure is balanced by the beam strength of the roller thereby resulting in parallel linear surfaces for the linear contact and even pressures throughout the contact. With the presence of an even pressure, the transferred image will be even in contrast or density. In addition, the balanced or even pressure will eliminate the axially directed component of force which would have produced wrinkling of the sheet.

Within the drum 10 there is mounted a drive motor 24 which is held in a fixed position externally by a plurality of screws 25 extending through the end plate 21. The diameter of the motor casing is slightly smaller than the internal diameter of the drum in order to provide sufficient clearance therebetween for the rotational movement of the drum. The drive shaft 26 for the motor extends through a suitable opening in the plate 21 and terminates in a pinion gear 27 secured thereto. (See FIG. 5.) This gear meshes with an enlarged gear 28 rotatably mounted with a bearing 30 upon a screw 31 threaded into a flanged bushing 32 secured to the end plate 21. (See FIG. 6.) A smaller gear 33 secured to the gear 28 and rotatably mounted on the bearing 30 meshes with a drive gear 34 for rotating the pressure roller 14.

Figure 6:
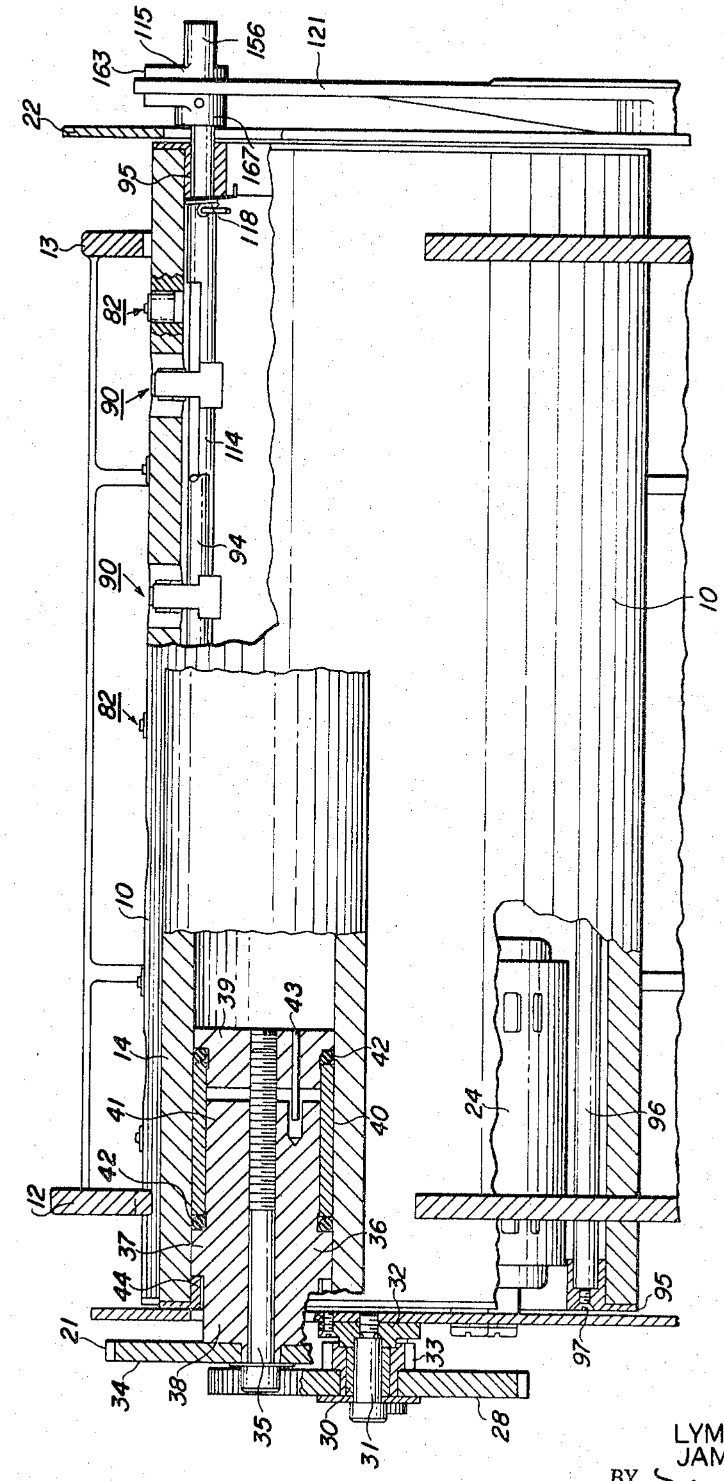
FIG. 6 is a cross-sectional view of the copy drum taken along a vertical plane parallel with the axis of the drum and showing the drive mechanism for the roller and the drum and the sheet material grippers.

As shown in FIG. 6, the drive gear 34 is secured by a screw 35 to a cylindrical thrust member 36 through which the screw slidably extends and which is slidably received into the left end of the roller 14. The member 36 is formed with an enlarged cylindrical portion 37 which engages the internal surface of the roller 14 and a reduced section 38 which extends out of the roller and through a suitable opening formed in the end plate 21. The gear 34 is held against one end of the section 38 by the screw 35 which is threadedly received into a cylindrical hub clamp 39 also positioned within the roller 14 and engageable with the internal surface thereof. A sleeve 40 encircles a reduced section 41 formed inwardly of the thrust member 36 and also a reduced section of the clamp 39 which is spaced a slight distance from the extreme inward end of the member 36. The sleeve 40 engages the internal surface of the roller 14 and is positioned to engage at both ends O-rings 42 placed upon the respective reduced portions of the member 36 and the clamp 39. The screw 35, member 36, clamp 39 and the sleeve 40 are all in axial alignment with the roller 14.

As the screw 35 is tightened, the clamp 39 is drawn toward the member 36 on a pin 43 which prevents rotation whereby compressing the O-rings 42 against the internal surface of the roller 14 and also to secure the drive gear 34 against the outer end of the section 38. With this arrangement, as the gear train comprising the gears 27, 28, 33 and 34 is driven by the motor 24, the gear 34 will impart rotation to the roller 14 through the thrust member 36 and the O-rings 42. During rotation of the roller 14, the same is held against axial movement by the end plates 21 and 22 which are normally spaced a slight distance from thrust bearings 44 secured at each end of the roller.

As will be presently described, the drum 10 is driven for rotation by its frictional engagement with the pressure roller 14 which itself is driven by the motor 24. Neither the drum nor the pressure roller utilize a conventional shaft either for producing rotation or supporting the same. As previously stated, the drum and the pressure roller are supported for rotation by a set of bearing rollers located at each end of the machine, one set being located between the side plate 12 and the left end plate 21 and the other set being located between the side plate 13 and the right end plate 22. In order to accomplish these locations, each of the side plates 12 and 13 is formed with central enlarged cutouts 45, see FIG. 3, for the plate 12, in order to permit the extension of the drum 10 and roller 14 beyond these side plates.

One set of bearing rollers includes the three fixed rollers 15, 16 and 17 which are located at the apexes of an isosceles triangle having the axis of the rollers 15 and 16 located on the base of the triangular arrangement and one of the sides $S_1$ extending between the axis of the roller 15 to the axis of the roller 17 while the other side $S_2$ extends from the axis of the roller 16 to the axis of the roller 17. As shown in the schematic force diagram of FIG. 7, the axis $A_1$ of the drum is located on the bisecting line B for the angle between the sides $S_1$ and $S_2$. The pressure roller 14, positioned between the drum 10 and the bearing roller 17, is held in this position by the roller 18 and has its axis $A_2$ slightly offset with respect to the bisecting line B. The axis $A_2$ is also slightly offset from a plane defined by the axis $A_1$ and a line of peripheral contact between the roller 17 and the pressure roller 14. With this arrangement, relatively great pressures on the order of 175 to 300 lbs. per linear inch may be achieved at the line of contact between the drum surface and the surface of the pressure roller by the application of a relatively small generating force.

In order to accomplish this high linear force, each of the rollers 18 is mounted on a force producing lever 46 (see FIG. 3), which comprises two identical lever plates 47, 48 connected together and in spaced parallel relationship by suitable pins 50. Each lever 46 is pivotally mounted at one end by a pivot pin 51 between the plates 12 and 21 on the left side of the machine and the plates 13 and 22 on the right side. The roller 18 is supported for rotation between the lever plates 47, 48 on the pivot pin 19, which is located inwardly of the lever 46 from the pivot pin 51 therefor. At the other end of the lever 46 there is provided a spring biasing means comprising a coil spring 52 held in compression between a retaining cap 53 secured on the lever and a seat 54 secured to and between the plate-pairs 12, 21 and 13, 22.

Figure 7:
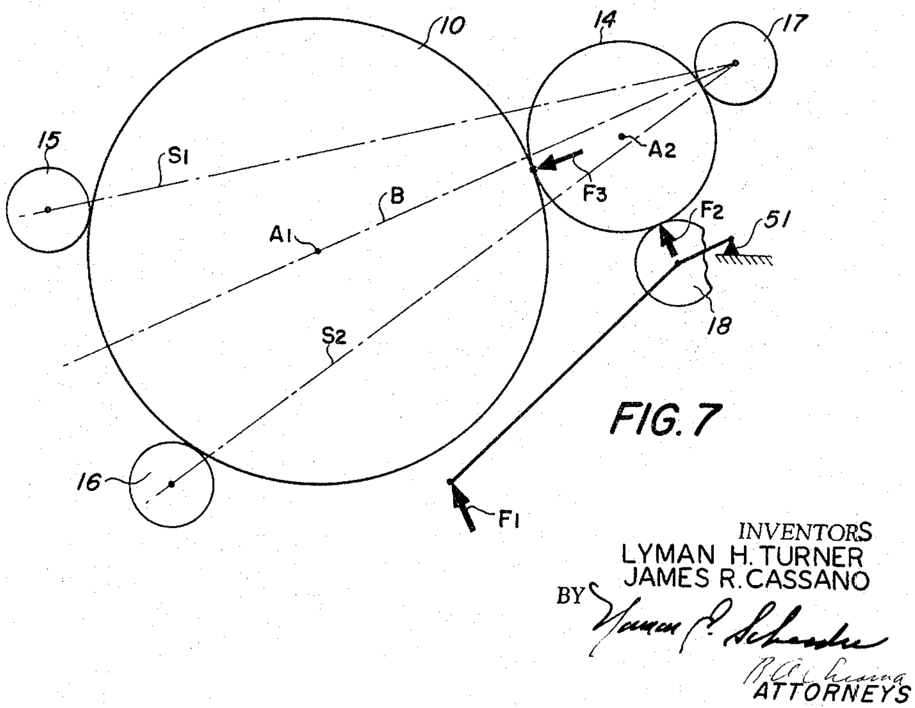
FIG. 7 is a schematic illustration combined with a force diagram of the force generating mechanism.

As shown in FIG. 3, the spring 52 is adapted to rotate the lever 46 clockwise about the pin 51. This force is represented by the arrow F in the force diagram of FIG. 7. In this action, the roller 18 is continuously pressed against the pressure roller 14 which, as a result of this force, will react to wedge itself between the fixed roller 17 and the drum 10. The installation of these structural parts is such that the axis $A_2$ for the pressure roller 14 is slightly displaced from the bisecting line B or, in effect, is offset relative to the plane defined by the axis $A_1$ and the line of contact between the bearing roller 17 and the pressure roller 14 and thereby functions under the principles of toggle-joint mechanics wherein the resistance force opposing the movement of a toggle-joint connection by a given applied force is inversely proportional to the distance between the connection and a line through the two points of resistance. The applied force illustrated by the arrow $F_2$ in the arrangement diagrammed in FIG. 7 is the result of the force $F_1$ produced by the compression of the spring 52 working across the movement arm measured from this spring force to the pivot pin 51. The effect of the force $F_1$ is transmitted to the roller 18 as the force $F_2$; and since the moment arm between the axis of this roller and the pivot pin 51 is relatively short, the transmitted or applied force $F_2$ on the roller 18 is relatively great or many times greater than the force $F_1$. In fact, the difference in the forces $F_1$ and $F_2$ is determined by the ratio of their effective moment arms, which, for the illustrated arrangement, is approximately 6 to 1.

The applied force $F_2$ continuously produces a wedging action in the form of a component of the force applied radially of the pressure roller 14 thereby resulting in a force $F_3$ between the contacting peripheries of the roller 14 and the drum 10. This force $F_3$ is applied linearly along the drum and roller and parallel to their axes and is the result of the toggle-joint structural arrangement which produces a still greater force $F_3$ than the applied force which in the illustrated case is the force $F_2$. As previously stated, the resistance force in a toggle-joint arrangement, which in the present arrangement is represented by the force $F_3$, is inversely proportional to the distance between the point at which the applied force or a component of the applied force is applied and the overcenter point in the toggle-joint. In the present arrangement, the former point is the axis $A_2$, and the latter point is on the line B or on the plane defined by the axis $A_1$ and the line of contact between the rollers 17 and 14. Since the distance between the axis $A_2$ and the line B or the above-defined plane is very short, a relatively large resistance force $F_3$ may be produced by a relatively small force $F_2$ being applied radially of the pressure roller tending to bring the axis $A_2$ into alignment with the plane. In effect, the wedging or toggle-joint action is produced by the arrangement wherein the distance between the roller 17 and the rollers 15, 16, which limit the radial outward movement of the drum and the pressure roller, is somewhat less than the sum of the diameters of the drum and pressure roller; and this component of force applied radially to the pressure roller attempts to toggle the drum-pressure roller combination through this slightly shorter distance.

For purposes of good pressure transfer, as will be presently described, the force $F_3$ which is used for effecting transfer should be between 175 and 300 lbs. per linear inch. This relatively high force can be generated by a relatively lesser force $F_2$ which, in turn, is produced by a still lesser force $F_1$. Conversely, a relatively light force $F_1$ is adapted to generate a relative high force $F_3$ by means of the lever arrangement compressing the elements 18, 46, 51 and 52 and the toggle-joint mechanism comprising the elements 15, 16, 17 and 18 and 46.

From the foregoing it will be apparent that the linear force or pressure between the drum 10 and the pressure roller 14 is accomplished with relatively little initiating force. It will also be appreciated that the copy drum 10 and the pressure producing roller 14 therefor are not mounted for rotation on shafts which would flex somewhat if subjected to the high pressures needed to effect pressure transfer. Instead, the drum and the pressure roller are mounted for rotation by the rollers 15–18 as well as each other in order to provide better and wider distribution of the great pressures which are necessary to effect good copy transfer.

Means are provided for guiding sheets of material such as transfer sheets, copy sheets and originals into, through and out of the machine. Other means are also provided to establish a relationship between the sheets for effecting programmed handling as the various sheets are conveyed through the machine and includes sheet registering devices and sheet clamping mechanisms.

In guiding sheets of material into the machine, a paper tray, generally indicated by the reference numeral 55, is provided and is arranged above the machine to direct a single sheet or double sheets to the vicinity of the nip of the drum-pressure roller arrangement. The tray is shown fully extended and in position to guide sheets into the machine; however, it may be retracted and pivoted from the position indicated by solid lines in FIG. 8 to the dotted position in order to eliminate the chance of damage when not in use and to blend into the contour of the machine.

The tray 55 includes a guide plate 56 upon which sheets of material are adapted to rest when the leading edges thereof are in the nip of the drum-pressure roller arrangement. The guide plate has fixed thereto along both longitudinal edges a frame member 57 formed with longitudinal slots 58 into which the edges of the plate are fixed. The plate 56 may be extended outwardly by an extension plate 59 slidably received in slots 60 formed parallel to and above the slots 58. Magnet strips 61 secured to the top surface at the outer edge of the guide plate 56 and to the bottom surface, inner edge of the extension plate 59 serve to hold the plate 59 in its extended position when moved thereto. The magnet strips are arranged to intercept each other as the extension plate 59 is pulled out in order to limit the travel of this plate and are of sufficient magnetic strength as to maintain the plates in an extended position until manually retracted wherein the strips 61 are forceably detached for permitting movement or telescoping of the extension plate into the tray.

Figure 10:
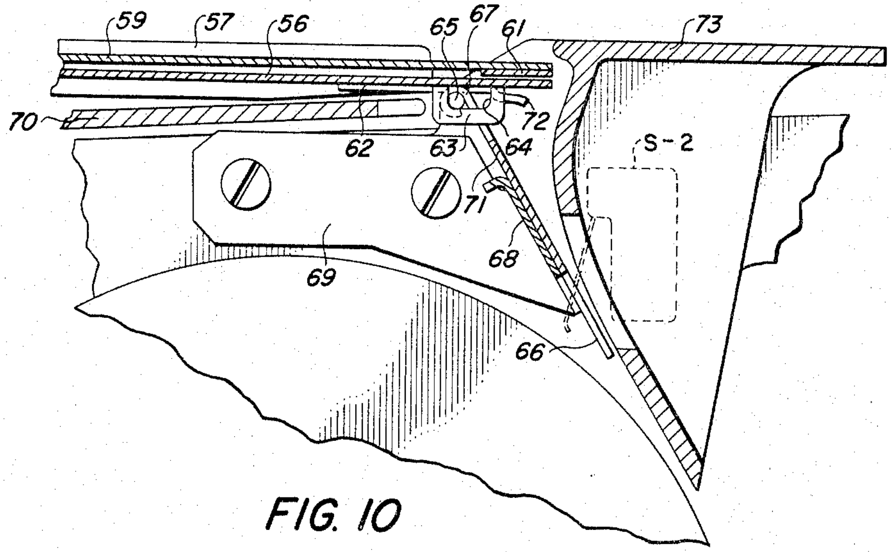
FIG. 10 is an enlarged sectional view of another detail.

As shown in FIGS. 2 and 10, the forward edge of the guide plate 56 is secured as by welding to a support plate 62 which extends along the length of the machine and has at each end thereof a turned down ear 63 having slots 64 through which a rod 65 is adapted to project. The rod 65 extends longitudinally of the machine and its ends may terminate in suitable clearances recesses formed in the side plates 12, 13. The rod 65 is supported in a fixed position relative to the machine by a paper guide plate 66 having turned tabs 67 which encircle the rod near both ends thereof. The plate 66, in turn, is spot welded to a bracket plate 68 formed with bent extensions 69 at the ends thereof and which may be detachably secured to the machine casing, illustrated generally by the number 70, by suitable screws.

Figures 8, 9:
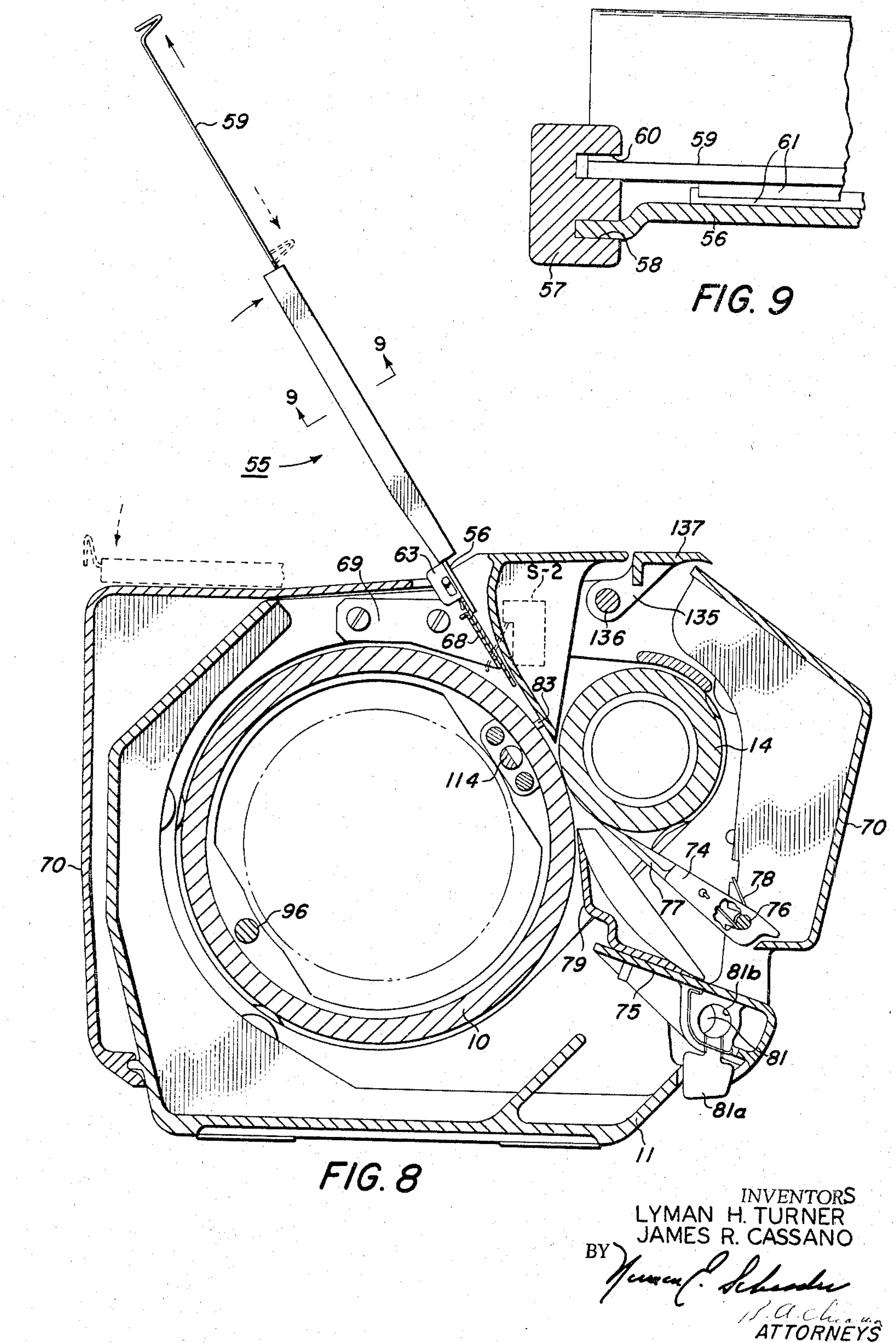
FIG. 8 is a cross-sectional view taken along the line 8—8 in FIG. 2.
FIG. 9 is an enlarged sectional view of a detail taken along the line 9—9 in FIG. 8.

Between the rod holding tabs 67, the plate 66 is formed with an edge 71 which is utilized to hold the tray 55 in the angled elevational position shown in FIG. 8. This edge is adapted to be grasped by the forward edge of the guide plate 56 and the adjacent forward edge of the support plate 62, the latter edge being formed into a turned portion 72 spaced from the plate 62 a distance equal to the thickness of the edge 71.

In arranging the tray for paper supporting use, the same is pivoted about the rod 65 and pulled upward and to the rear of the machine at the same time in order to move the ears 63 until the rod 65 is at the lower ends of the slots 64. This will permit the bent portion 72 to clear the edge 71 of the plate 66. When shown in the position illustrated in FIG. 8, the tray 55 is gently pushed downwardly and forwardly of the machine in order to bring the edge 71 between the adjacent lower edge of the plate 56 and the turned portion 72 and firmly locked therebetween. The extension plate 59 may then be extended upwardly in order to provide a fully extended tray 55 for sheets of paper.

The bent extension 69 also supports an upper paper guide device 73 which cooperates with the lower paper guide plate 66 for guiding the transporting of various sheets of material into the machine. A normally open switch S–2 (see FIG. 10) connected to the motor 24 is mounted in the machine with its actuator in the input paper path so that the machine cannot be capable of operation without paper in the chute thereby preventing damage to the original sheet or master.

Figures 16, 18:
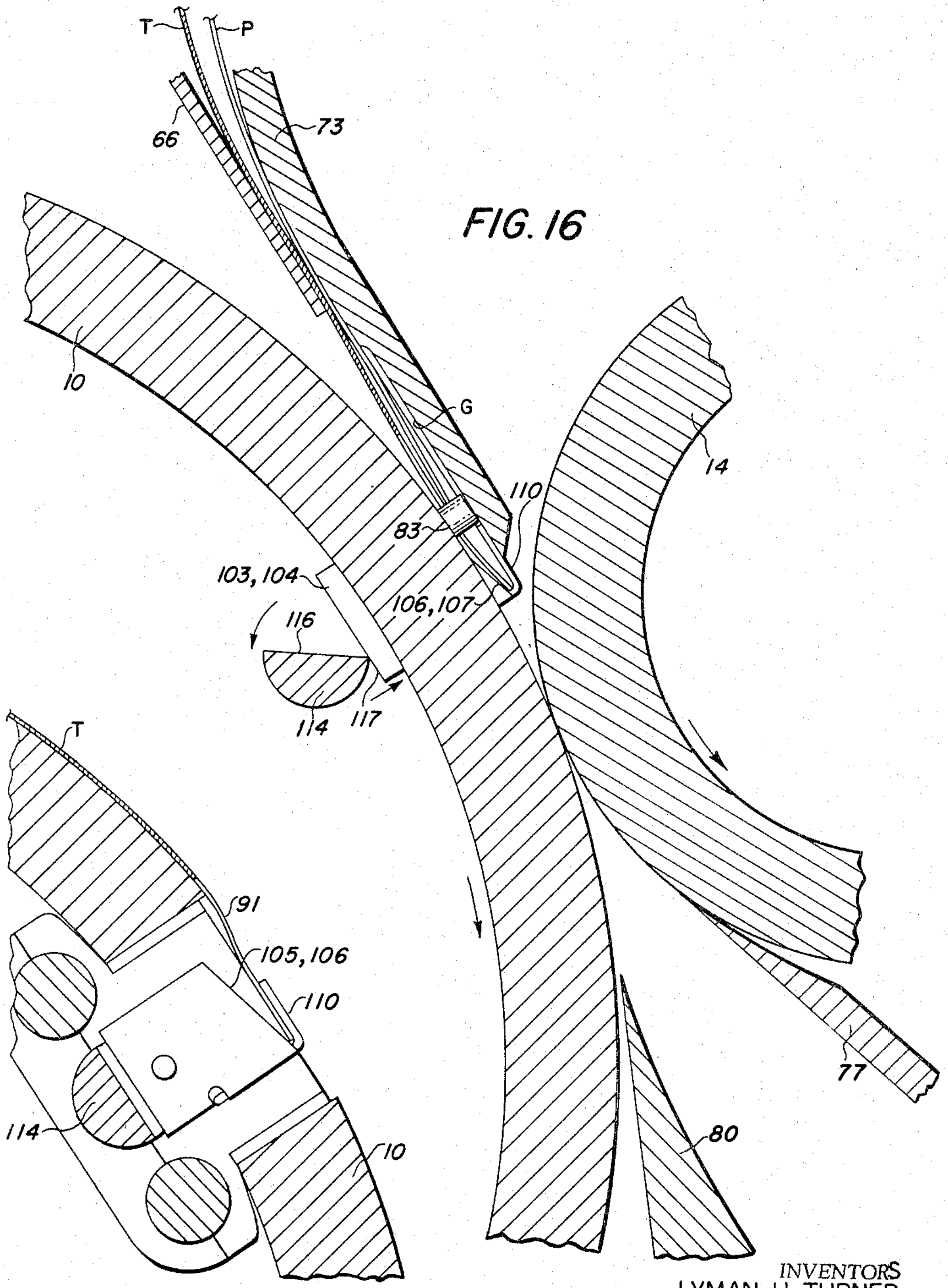
FIG. 16 is an enlarged fragmentary view of a detail of the invention in one position of operation.
FIG. 18 is an enlarged fragmentary view of the detail in FIG. 16 in another position of operation.
Figure 17:
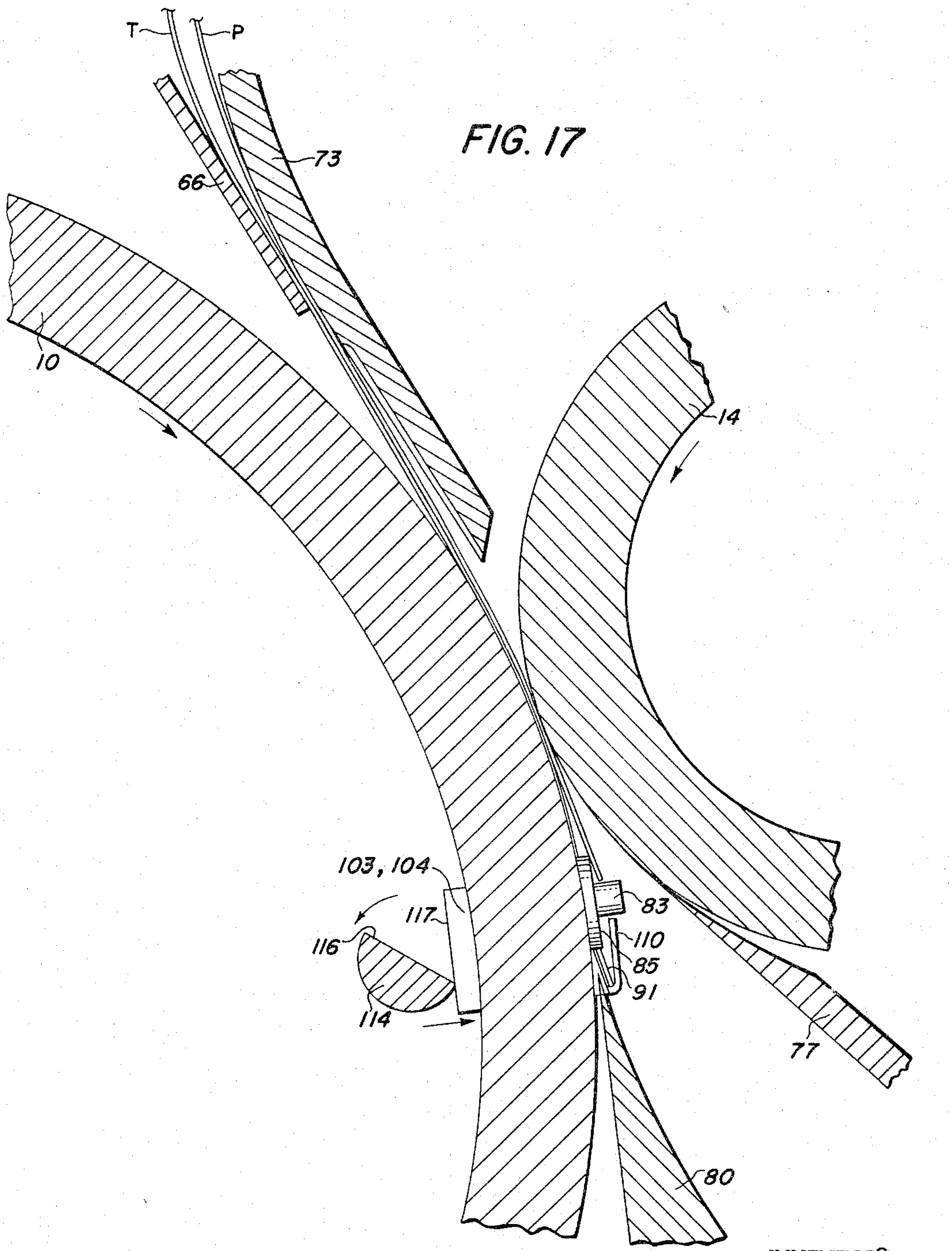
FIG. 17 is an enlarged fragmentary view of the detail in FIG. 14 in a position of operation.

In emerging from the machine, the sheets of material are guided by an upper stripper element 74 and a lower chute 75 (see FIGS. 8, 16 and 17). The stripper 74 is pivotally retained by outwardly projecting pins 76 to the machine casing 70 and is formed along one longitudinal edge with at least two tongue portions 77 (see FIG. 2) which are preferably knife-edge in their outer extremities. A torsion spring 78 secured at one end to the machine casing 70 and at its outer end to the stripper serves to continuously force the knife-edged tongues 77 against the lower section of the pressure roller 14 on the output side of the nip for the drum-pressure roller combination. As a sheet or sheets of material are forced out by the rotation of the drum and the pressure roller, the sheet or sheets are prevented from adhering to the roller 14 and stripped off this roller by the stripper 74.

The chute 75 is spaced slightly lower than the stripper 74, as shown in FIG. 8, and includes an upper plow section 79 having a plurality of teeth 80 (see FIGS. 15 and 16) arranged along the outer edge thereof and spaced a slight predetermined distance from the periphery of the drum. This spacing is provided by end plates 79*a* (see FIG. 2) made integral with the chute 75 at the ends thereof beyond the edges of a sheet moving between the drum and the pressure roller. The plates 79*a* have short and narrow bearing surfaces which conform to and contact the drum when the chute is in paper stripping position, as shown in FIG. 8. With the bearing plate against the drum, the teeth 80 will be spaced a predetermined distance from the drum surface.

The purpose for the spacing relative to the drum periphery is to provide sufficient clearance between the plow teeth 80 and the drum surface so that a master sheet can be supported on the drum without danger of interference or damage to the master caused by the plow teeth.

Figure 5:
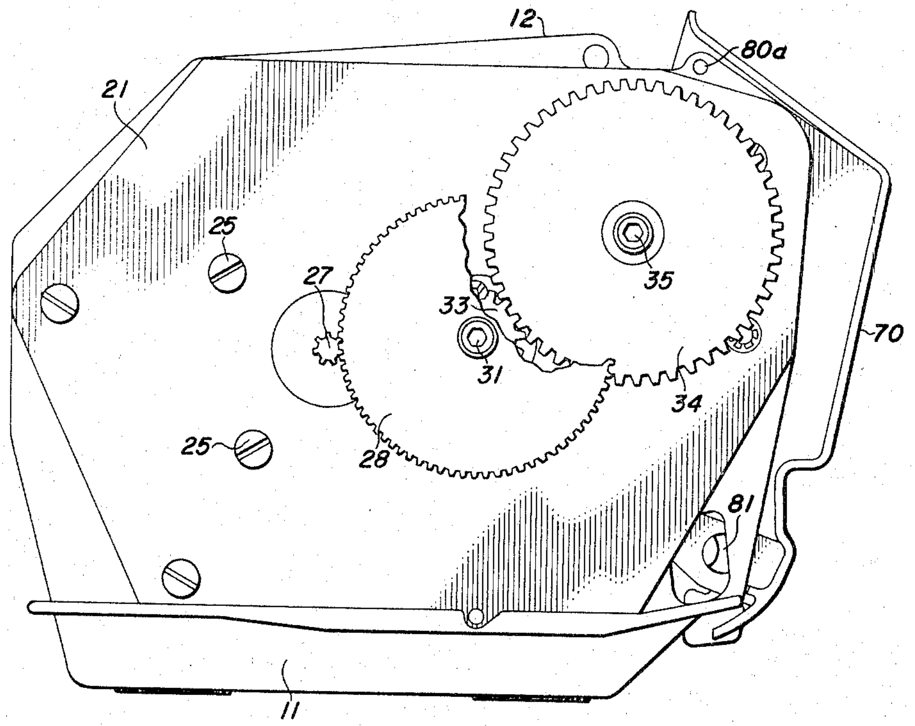
FIG. 5 is a left-hand end view of the machine in FIG. 1 showing the drive mechanism utilized therein.

The chute 75, the end plates 79*a* and the teeth 80 are movably mounted relative to the periphery of the drum by being secured to the front cover 70 which itself is pivotally mounted on the machine base by suitable pivot pins 80*a* secured to the casing and rotatably supported in the end plates 12, 13. As shown in FIG. 5, the casing 70 may be swung outwardly about the axis line defined by the pins 80*a* at each end of the machine.

The chute 75 is adapted to be held at this predetermined distance from the drum periphery and is made movable relative thereto by the use of two sliding wedge blocks 81, each of which is adapted to be driven manually by a thumb tab 81*a* through a suitable opening 81*b* formed in the chute 75 and through an aligned square opening having a straight bearing edge 81*c* formed in the machine casing, such as the plates 12, 13. The wedging taper of the blocks 81 will, when driven, slide along each of the straight edges 81*c* for pressing the end plates 79*a* against the drum and drawing the chute 75 snuggly into a secure position upon the machine base wherein the edges of the teeth 80 are spaced the predetermined distance from the periphery of the drum. This pressure against the drum and the drawing of the chute will cooperate with the pivot pins 80*a* for providing a rigid support for the front casing 70 and the chute 75. When it is desired to replace the chute or to move it away from the drum for clearing the drum of paper jams or permit cleaning of the drum, the blocks 81 may be pulled toward each other for permitting detachment from the openings and the machine. The casing 70 may then be swung outwardly and upwardly to expose the drum and pressure roller. Repositioning of the casing 70 and the blocks 81, as previously described, will again return the teeth 80 precisely to their previously occupied positions relative to the drum.

Because of the critical predetermined spacing between the drum periphery and the adjacent portions of the teeth 80, it is important that the teeth be returned to a precise positioning each time the casing 70 is moved. This is accomplished by the pins 80*a* which insure that the forward edges of the teeth will be positioned parallel to the axis of the drum, and by the bearing surface on the plates 79*a* and the wedging of the blocks 81 which insure that the spacing between the teeth and the drum periphery will be uniform throughout the length of the drum and will be the same as the previous positioning of the chute 75. In effect, then, the blocks and the cooperating structure insure that the chute 75 will automatically become aligned for each use of the blocks and cooperating structure.

As previously indicated, the machine is provided with means for establishing positionable and operative relationships between the sheets which are introduced into the machine in order to effect programmed handling of the machine operation. These means include sheet registration devices and clamping devices as well as various operative mechanisms associated therewith.

Before commencing the description and operation of these devices, a brief outline of the sheet manipulation that occurs during a complete machine cycle of operation will now be made. During the first stage of operation of the machine, both a blank transfer sheet and an original which has been typed or otherwise imprinted with an appropriate ink formulation, which will readily transfer from one sheet to another by the application of extreme pressures, are inserted preferably simultaneously into the nip of the drum-pressure roller combination. It is imperative in this step that the transfer sheet be applied so that it will be in contact with the drum 10 during rotation thereof and that the type script to be copied be in contact with the transfer sheet. Both the transfer sheet and the original are driven through the nip of the drum-pressure roller and during the drive, which in this stage will be a single revolution of the drum, the transfer sheet will become clamped to the drum and remain so while the original is immediately stripped and directed out of the machine by means of the guide 74 and the chute 75.

The next step in the cycle of operation requires the insertion of individual sheets of copy paper into the machine. During this step, the image on the transfer sheet is transferred to each copy sheet as they are inserted individually in the machine. During each transfer, the transfer sheet remains on the drum, and the copy sheet is stripped out of the machine until the last programmed copy sheet has been made. As the last copy sheet is being stripped out, the transfer sheet is also being removed from the machine so that both sheets more or less are removed simultaneously.

Figures 11, 12:
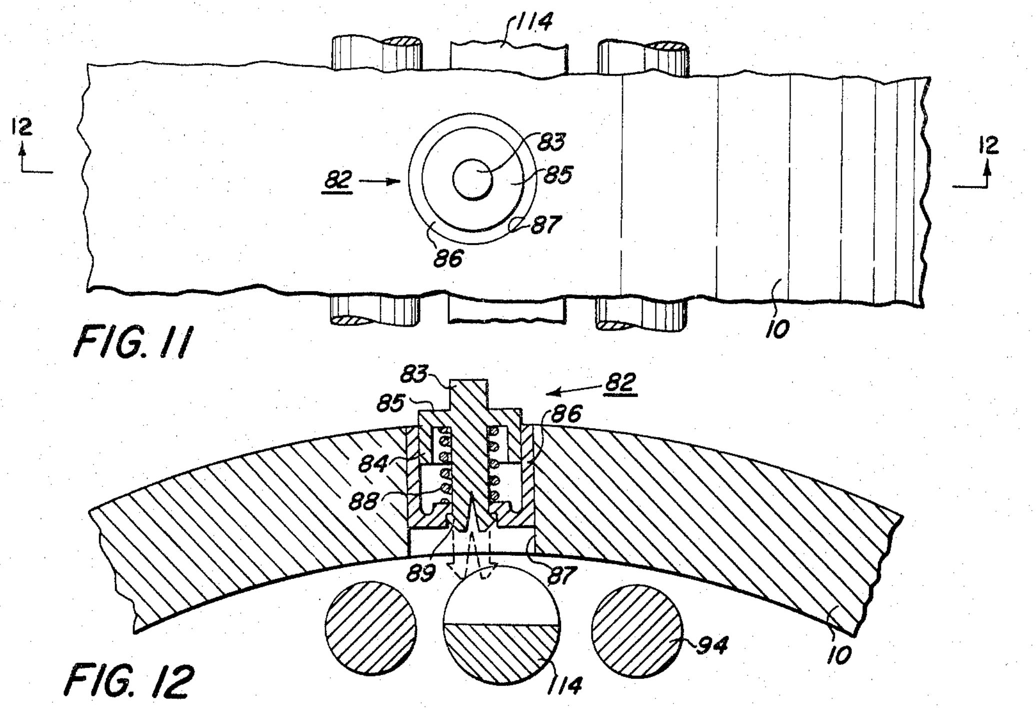
FIG. 11 is an enlarged view of one of the registration devices utilized in the present invention.
FIG. 12 is a sectional view taken along the line 12—12 in FIG. 11.

For automatically controlling positioning of the original sheet of material from which a transfer sheet will derive its inked image and for the automatic positioning of subsequently applied sheets of copy paper, the drum is provided with a plurality of registration devices 82 each having a pin 83 against which the leading edges of copy sheets or the original sheet abuts and which are arranged in a line parallel to the axis of the drum but coincident with the periphery thereof. As shown in FIGS. 11 and 12, the pin 83 extends radially of the drum beyond the periphery thereof and is formed with an enlarged diameter section 84 having an annular shoulder 85. The registration device 82 is adapted to slide within an inverted cylindrical element 86 tightly fitted into an opening 87 formed in alignment in the wall of the drum 10. A spring 88 normally held in compression within the element 86 between the bottom closed wall thereof and an inner wall of the shoulder 85 thereby normally biases the registration pin 83 outwardly and the shoulder 85 slightly beyond the periphery of the drum surface. In order to maintain the pin 83 and the section 84 within the cylindrical element 88, the pin 83 extends within the element 86, through the opening in the bottom wall thereof and terminates in a split and flared end 89 which prevents extraction of the pin 83 from the device 82.

Figure 15:
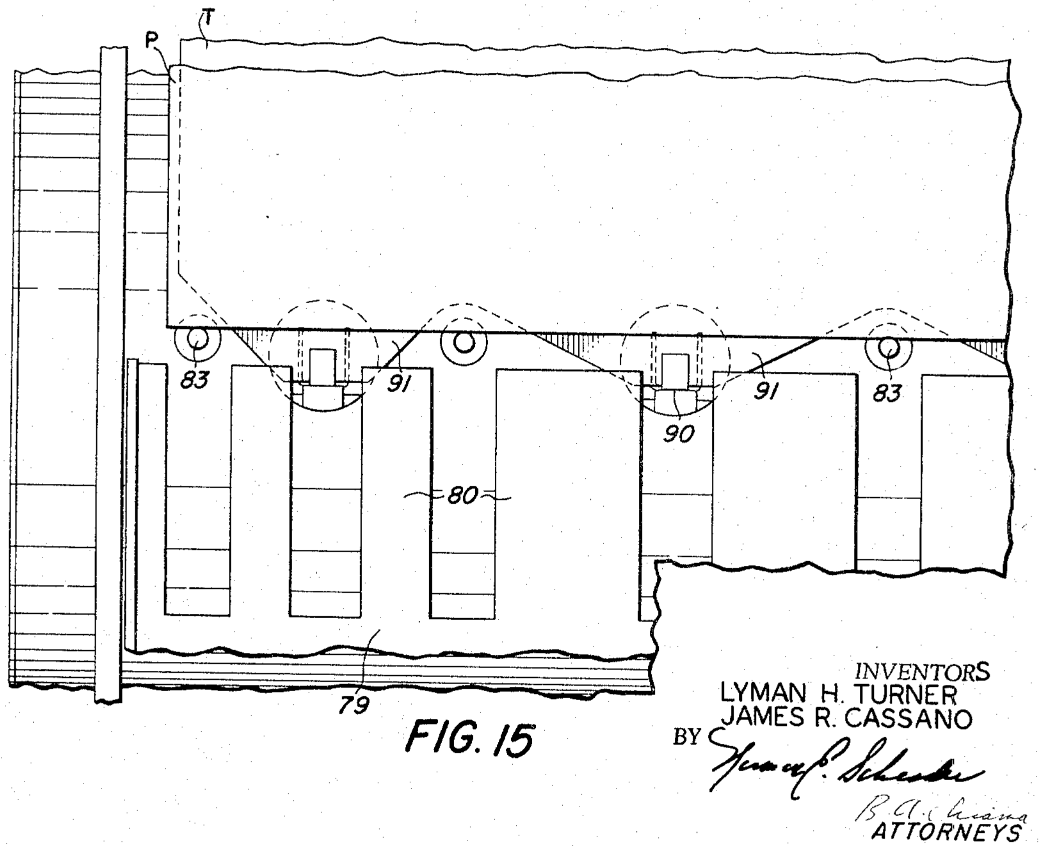
FIG. 15 is a schematic illustration of the relationship of transfer material and structure used in cooperation therewith.

As shown in FIGS. 15, 16 and 17, the registration pins 83 are adapted to engage a sheet of material, such as copy paper or an original, indicated by the reference letter P. As shown, the sheet P, when laid upon the paper tray 55 or when shoved toward the nip of the drum-pressure roller combination, is prevented from assuming any other position except that shown in FIGS. 15 and 16. The illustrated positions are those assumed by the original P and the transfer sheet just prior to initial operation of a production cycle. The forward edge of the sheet P is shown in engagement with the pins 83 which are held slightly downwardly by the trailing edge of the paper guide 73. This engagement of the pins 83 with the lower surfaces of the upper guide 73 insures that the leading edge of a paper sheet will not go above or beyond the registration devices when the paper is inserted into the machine. Lowering of the pins 83 also maintains the shoulders 85 below the periphery surface of the drum and out of the way when sheets of paper are introduced into the machine thus insuring that an original document or copy sheet is always against the registration pins 83 just prior to start of machine operation. In addition, by maintaining the pin 83 and shoulder 85 in a lowered position prior to start of operation also minimizes the chances that the edge of a sheet of material will be turned toward the drum periphery by the friction produced by the pins 83 as they are completely lowered by the roller 14 during machine operation. Normally, the leading edge of a sheet of paper is held above the periphery of the drum by the shoulder 85, as shown in FIG. 17, and which will be discussed hereinafter. A groove 6 is formed in the lower surface of the guide 73 for each of the registration pins and prevents the leading edge of the sheet P from being placed above the pin 83 or to come between the top of the pin and the lower edge of the guide 73. As previously stated, the sheets P and T, when introduced into the machine, assume the initial position shown in FIG. 16 where the edge of the sheet P is against the pins 83.

The drum is also provided with a plurality of clamping devices which serve to selectively clamp a transfer sheet, designated by the letter T, to the drum periphery. These clamping devices, designated generally by the reference numeral 90, are spaced alternately with the registration devices 82 and are arranged along a line parallel to these devices but spaced slightly forward therefrom. As shown in FIG. 15, the transfer sheet T is formed with a scalloped forward edge having extension tabs 91 which are each applied to one of the clamping devices. Since there are four extension tabs 91, then only four clamping devices will be necessary. It will also be seen in FIG. 15, that the clamping devices 90 and the registration devices are arranged such that the tabs of the scalloped edge of the transfer sheet T leads, or is forward of the leading edge of the copy sheet P.

Figures 13, 14:
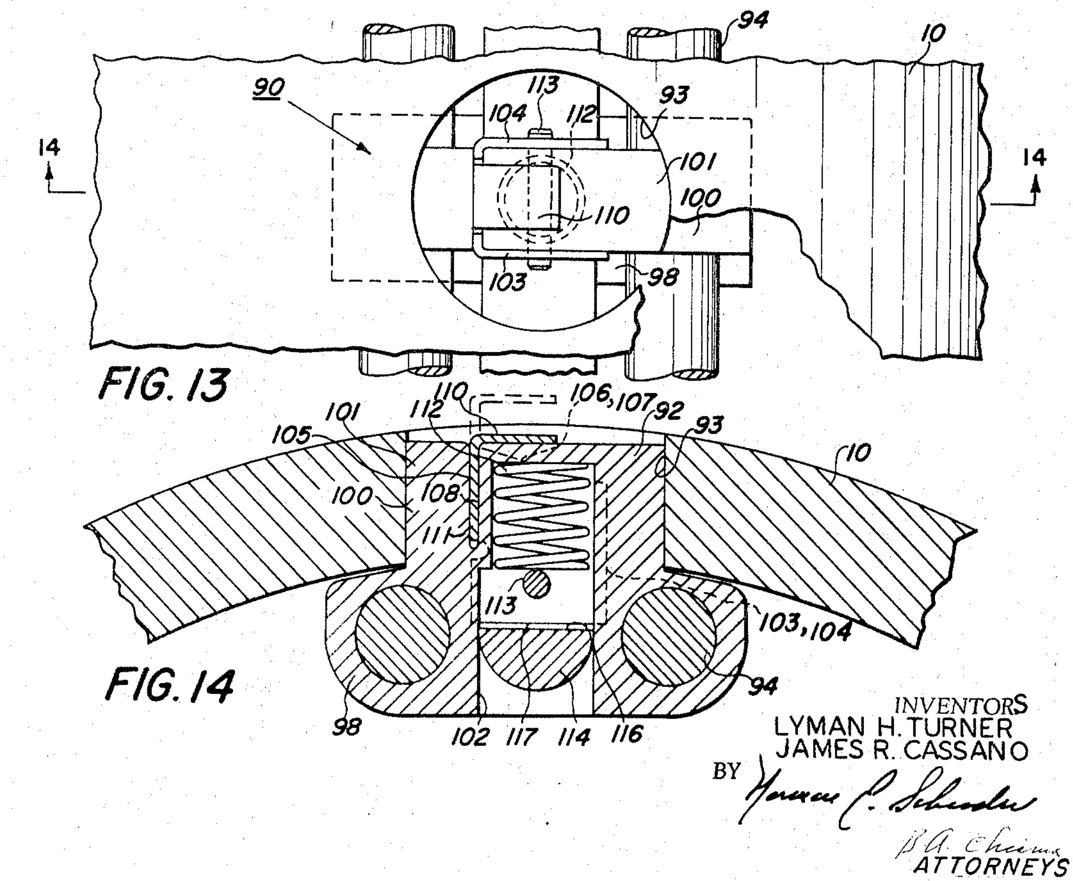
FIG. 13 is an enlarged view of one of the clamping mechanisms utilized in the present invention.
FIG. 14 is a sectional view taken along the line 14—14 in FIG. 13.

The details of one of the clamping devices are shown in FIGS. 13 and 14. Each device includes a moulded plastic block 92 adapted to extend through a suitable circular opening 93 formed in the wall of the drum 10. A pair of parallel arranged mounting rods 94 extending through each of the blocks and along the entire length of the drum 10 (see FIG. 6) serve to hold each of the blocks in proper position within their respective openings 93. These rods are mounted in and between bearing bushings 95 which are held into the ends of the drum by these rods and a third tie rod 96 located diametrically of the rods 94. Suitable screws 97 may be utilized to fasten the ends of the rods to their respective bushings 95.

Each block 92 is formed with a lower enlarged section 98 which is contained within the interior of the drum 10 and through which the mounting rods 94 project. Formed integrally with the lower section 98 is an upper reduced section 100 which fits within the opening 93 and terminates in an upper surface 101 slightly below the plane of the upper end of the opening 93. From FIG. 13, it will be seen that the section 100 is curved at its forward and rearward ends to fit snugly into the oppositely curved sides of the opening 93 thereby precisely locating each of the clamping blocks and maintaining these in a fixed position against forces which will act along circumferentially of the drum.

Both the sections 98 and 100 of each block are formed with a continuous central recess 102 which, when traced radially of the drum, is opened at the bottom of the section 98 and closed at a point within the upper section 100 slightly below the top surface 101. When traced axially of the drum, the recess 102 extends completely through or, in other words, is open at both sides of the block 92. However, the recess, when traced axially, is partially closed by the metallic side plates 103, 104, one located on each side of the upper section 100 of a clamping element that is movably mounted upon the block 92. This clamping element, generally indicated by the reference numeral 105, includes the parallel arranged side plates 103, 104 which are formed with upper edges 106, 107, respectively, that are inclined upwardly toward the rear of the block 92, a rear plate 108 integral therewith and with an extension tab 110 of the rear plate. The tab extends above the side plates 103, 104 and the rear plate 108 and is bent toward the forward end of the block 92 at a point slightly above the highest inclined point relative to the upper edges 106, 107. In order to accommodate the rear plate 108, the upper section 100 for the block 92 is formed wtih a slot 111 into which the plate 108 may slide radially relative to the drum 10. Preferably, the clamping element 105 is formed from a single piece of stamped spring metal, thereby permitting limited flexing of the tab 110 during operation of the clamping device.

The clamping element 105 is adapted for vertical movement, as seen in FIG. 14, or radially relative to the drum axis in order to accomplish clamping and unclamping of the scalloped leading edge of the transfer sheet T. In the position shown in solid lines in FIG. 14, the tab 110 engages the top surface 101 of the block 92 and is normally held in this position by a spring 112 held in compression within the recess 102. This spring at one end engages the upper wall of the section 100 and at its other end is forced against a pin 113 which extends through the side plates 103, 104 and the recess. When in clamping position, one of the tongues 91 of a transfer sheet is adapted to be held between the tab 110 and the top surface 101. The purpose of the inclined upper edges 106, 107 is to guide the leading edges of the tabs 91 fully into the space between these edges and the clamping tab 110 in order to insure full aligned gripping of all of the tabs 91. In addition, the incline to the upper edges permits the raising of the leading edges of the tabs 91 above the surface of the drum during stripping of the transfer sheet.

Means are provided to release each of the clamping devices simultaneously, and to this end the drum has mounted internally therein and parallel to its axis a release rod 114 which is adapted to be inserted in the recess 102 in each of the clamping block positions 98. As shown in FIGS. 6 and 14, the rod 114 is arranged between the tie rods 94, is rotatably retained at one end of the drum and extends out the other end thereof terminating in a cam actuator element 115 secured to the end of the rod. The rod is formed throughout its length or at least in that portion immediately below each clamping device 90 with a flat cam surface 116 upon which the lower edges 117 of the side plates 103, 104 for each clamping element 105 are forced by their respective springs 112. Normally, the rod 114 is held by its own mounting means in the position shown in FIGS. 14 and 18 wherein all of the clamping tabs 110 are held down against the top surfaces 101 of the clamping blocks. In order to effect this condition, the cam surface 116 must be parallel with the bottom edges 117 in order to present the latter with the longest possible distance they can travel.

For release of the transfer paper or to maintain the clamping devices in unclamped positions prior to the insertion of a transfer sheet into the machine, as will be described below, the release rod 114 is rotated in order to cam the edges 117 upwardly thereby forcing each of the clamping elements 105 upwardly against the bias of their respective springs 112. This rotation of the rod will simultaneously release all of the clamping devices 90. Release of the rod to assume its normal position, that is, removal of any force which will cause rotation, will permit a spring 118 (see FIG. 6) which encircles the release rod 114 to return the same to its original position against a stop (not shown). In order to eliminate any restrictive force upon the extension tabs 110 when the same are fully opened at the end of a production run, as shown in FIG. 16, the paper guide 73 is formed with grooves similar to but deeper than the grooves G for permitting total clearance for the tabs 110.

The reproduction machine is provided with a programming mechanism which controls the operation of the machine once it is set in motion and in cooperation with a copy countng mechanism and an electrical control circuit. The programming mechanism, illustrated in operative detail in FIGS. 19 through 24, is located in the machine between the end plate 22 to which it is attached and the machine casing, see FIG. 2. Generally indicated by the reference numeral 120, the programmer comprises a number of control levers which assume various motions and positions during a single and complete reproduction cycle. Such a cycle requires two complete rotations of the drum 10, one to convert the master or transfer sheet T into a master and one revolution to produce one copy from the transfer sheet. The structure of the programmer mechanism and the counter mechanism is such that every reproduced copy desired requires one full rotation of the drum. For any series or multiple copy program, there will be as many drum rotations as there are programmed copies to be made plus one additional rotation to produce the master transfer sheet.

The programmer mechanism 120 comprises a first lever 121 pivotally mounted on and arranged parallel to the plate 22 by a pin 122. It is preferred that the lever 121 be spaced from this plate by an integral boss 123 in order to provide space between the lever and the plate 22 for additional structure. A torsion spring 124 is anchord at one end on the pin 122 and the lever 121 and normally biases the lever counterclockwise, as viewed in FIG. 19, toward a stop 125 secured to the plate 22. However, other structure normally limits this rotation of the lever, as will be presently described.

Counterclockwise rotation of the lever 121 is prevented by the intervention of two individually controlled actuating members which need release in order to allow further rotation of the lever. One of the actuating members is in the form of a cam lobe 127 positionable in the path of a cam surface 128 of the lever and which is integral with and radially protrudes from a circular element 129 having a circular ratchet 130 formed thereon together with a copy indicating and setting knob 132. The element 129, ratchet 130 and the knob 132 are rotatably fastened to the plate 22 by a screw 131.

The other actuating member which releasably impedes rotation of the lever 121 is a latch element 133 normally within a recess 134 formed in the free end of the lever. The latch 133 is integral with a boss 135 secured to a shaft 136 to be rotatable therewith. The shaft 136 is mounted for limited rocking or rotation within suitable apertures formed in the machine side plates 12, 13 and has secured thereto a push bar 137 accessible from the exterior of the machine to permit actuation by a machine operator. Manual depressing of the push bar 137 will produce counterclockwise rocking of the shaft 136, as viewed in FIG. 19, with consequent movement of the latch element 133 out of the recess 134.

Figure 19:
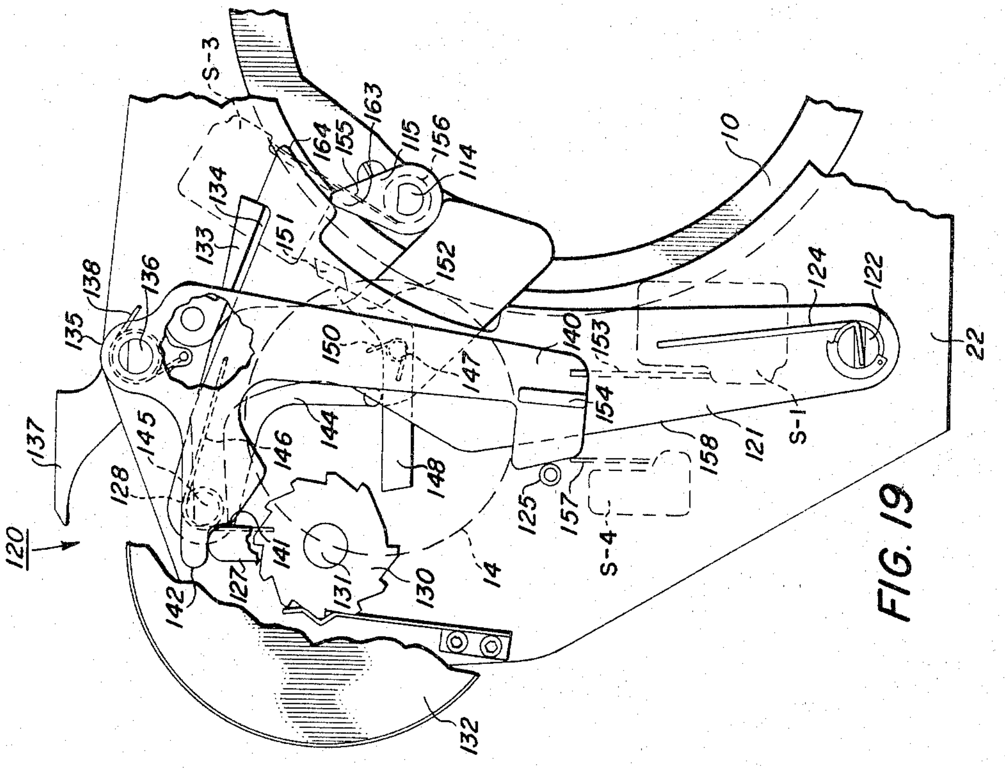
FIG. 19 is a plan view of the programmer mechanism utilized in the reproduction machine.

A torsion spring 138 having one end anchored in the plate 22 and its other end fastened to the boss 135 serves to normally maintain the push bar 137 in its uppermost position, the one illustrated in FIG. 19, once it has been actuated. The latch 133 is formed with a thin narrow cross-section which offers some limited resiliency to the element. When the bar 137 is rotated back to its initial position by the spring 138 and after the operator has released the bar, the latch element will remain out of the recess 134 and against the upper end of the lever 121 under its own resilient force. When the lever is rotated clockwise, the element will snap back into the recess 134 when in alignment therewith.

Figure 20:
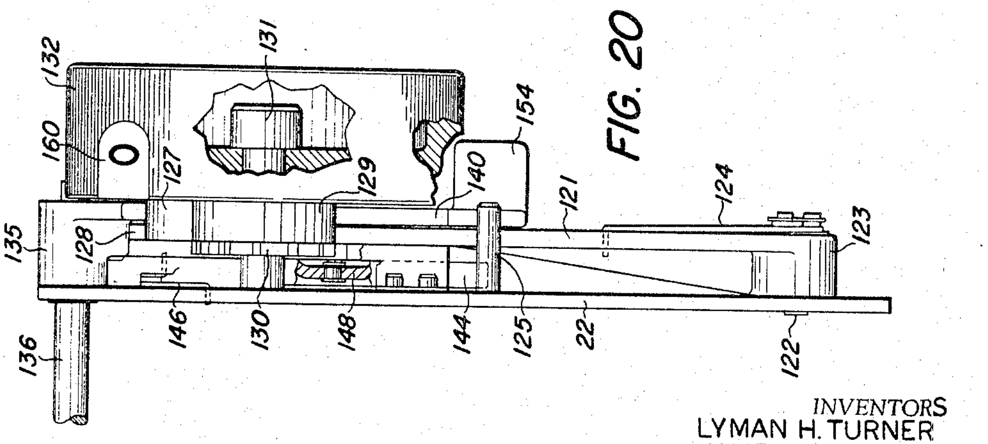
FIG. 20 is a side elevational view of the programmer mechanism.

The programmer mechanism 120 is provided with a second lever 140 made integral with the boss 135 and therefore pivotally mounted with the shaft 136. As shown in FIG. 20, the lever 140 is in a plane parallel with the plane of the lever 121 and very close thereto and is provided with a cam surface 141 cooperable with the cam lobe 127 in the same manner as the surface 128. However, the lever 140 is also provided with a second cam surface 142 adjacent the surface 141 and angled therefrom by approximately 90°. This cam surface extends horizontally above the lobe 127 and is normally biased in this position in contact with the upper tip of the lobe by the torsion spring 138 which acts upon the shaft 136 and the boss 135. The lobe 127, in effect, prevents rotation of the lever 140 when the machine is in shutdown condition, as shown in FIG. 19.

A third lever 144 is also provided in the mechanism 120, and this lever is pivoted at its upper end by a pin 145 secured to the plate 22. A torsion spring 146 having one end secured to the plate 22 and its other end secured to the lever 144 normally biases the same in a counterclockwise direction. The lever 144 is in a plane parallel with the planes of the levers 121 and 140 and is spaced inwardly therefrom toward the plate 22. Pivotally mounted by a pivot pin 147 on the lever 144 in a plane parallel thereto and spaced therefrom toward the lever 121 is a latching lever 148. A torsion spring 150 normally biases the projecting end 152 of lever 148 in a clockwise direction and against a latch stop 151 formed on the lever 121.

The programmer mechanism 120 is also arranged to cooperate with three switches which may be suitably mounted on the end plate 22 at levels which will permit actuation by the levers previously described. The conditions and function of these switches will be discussed hereinafter during the description of the operation and the electrical system. However, their cooperation with the levers will be briefly stated at this point in order to better illustrate the sequences of events that the programmer experiences.

One of the switches, S–1, the push bar or the start switch is provided with a switch actuator 153 cooperable with a tab 154 formed on the lever 140. The second of the switches, the home switch S–3, is provided with a switch actuator 155 cooperable with a boss 156 formed on the cam actuator 115. The third of the switches, the master count switch S–4, is provided with a switch actuator 157 made cooperable with a cam edge 158 formed on the middle section of the lever 121 to be actuated thereby when this lever is pivoted from the position shown in FIG. 19 to the one shown in FIG. 21.

Figure 21:
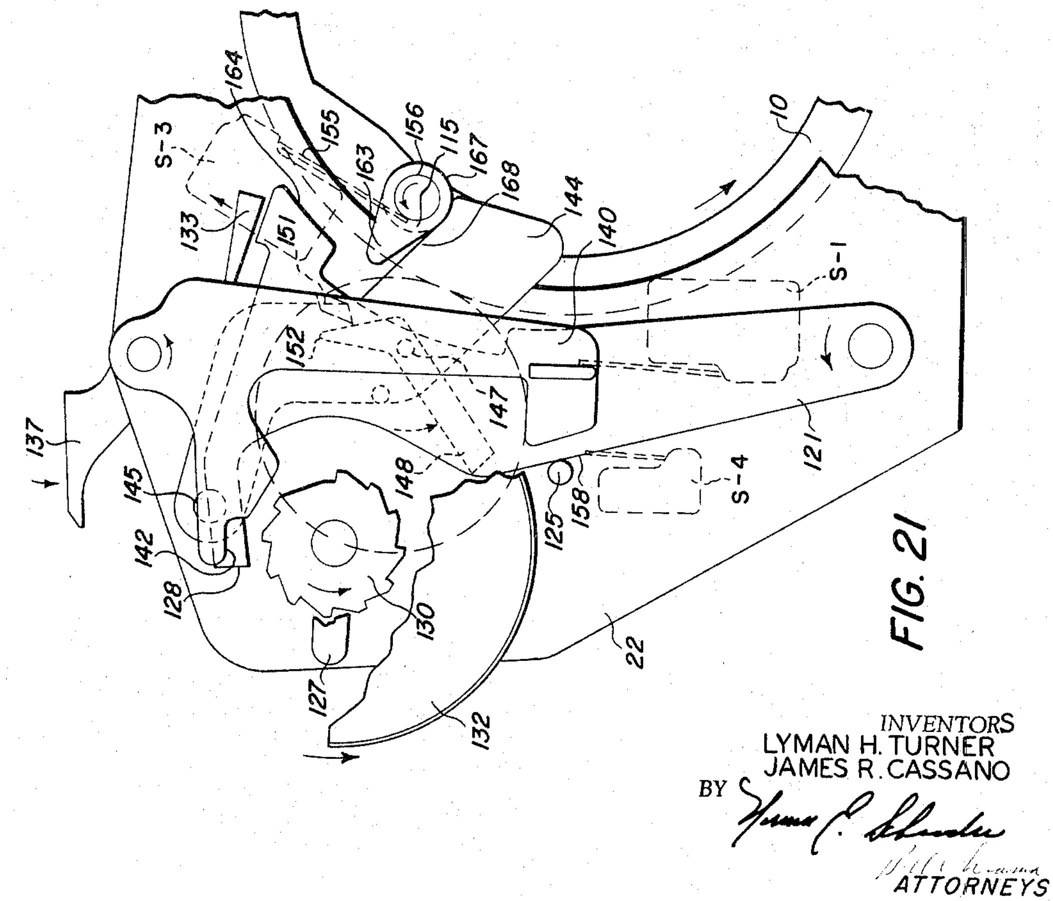

To set the programmer 120 and, consequently, the machine in operation, the operator must perform two actions after sheets of material have been inserted into the machine. When not in use and at the close of a previous operation of the machine, the programmer and its control structure are in the positions shown in FIG. 19. The first step or action to be performed is to dial the number of copies to be produced on the machine, and to this end the operator rotates the knob 132 until a selected number from the numerals 160 is in registry with suitable indicia or reference point on the machine casing. For purposes of the present description, it will be assumed that the knob 132 has been rotated to effect the production of three copies. In FIG. 21, the ratchet 130 has been rotated counterclockwise in the direction of the arrow to effect this selection of copies to be made. A spring clip 161 (see FIG. 19) engageable with the individual teeth of the ratchet will releasably hold the ratchet into any position it is rotated.

In rotating to the position shown in FIG. 21, the cam lobe 127 was also moved to thereby release its engagement with the cam surfaces 128 and 142. As previously stated, the clamping shaft 114 is normally biased to a predetermined position by the return spring 118, and this position is one wherein the program control actuator and a cam 163 formed thereon assume the position they take in FIG. 21. Such a biasing action by the spring 118 also results in the closing of the clamping devices 90. However, in order to condition the machine for ease of operation and to render it accessible for more immediate use, the shaft 114 is normally held in a second predetermined position to maintain the clamping devices 90 open when the machine is in ready-to-use condition. In this condition, sheets of paper may be inserted into the machine which is dispoced to clamp the transfer sheets T along the scalloped edge thereof. The second predetermined position of the shaft 114 is maintained by the engagement of the cam 163 against a cam surface 164 formed on the lever 121, as shown in FIG. 19. This will maintain the clamping tabs 110 in their unclamped positions when the machine is standing idle, as shown in FIG. 16.

The second operative step to be performed by the operator is to depress the touch bar 137 momentarily. This action will cause the upward movement of the latch element 133 in order to free the lever 121 for counterclockwise rotation. Since the cam lobe 127 was previously moved out of the path of movement of the cam edge 128, the lever 121 is now totally free to rotate until it abuts the stop 125. In so moving, the cam surface 164 also moves out of the path of rotation for the cam 163 allowing the control actuator 115 to rotate to the position shown in FIG. 21 and permit closing of the clamping devices 90. Each of the tabs 91 on the leading scalloped edge of the transfer sheet T will be clamped to the drum 10, as shown in FIG. 18.

Depressing of the touch bar 137 also produces counterclockwise rotation of the lever 140 since the cam surface 142 is free to move now that the lobe 127 has been moved. This rotation of the lever 140 will cause closing of the normally open switch S–1 which, when combined with the previously closed paper sensing switch S–2, completes a circuit to the motor 24 for energizing the same. The location of the parts as illustrated in FIG. 21 are indicative of the condition immediately prior to energization of the motor. Upon this occurrence, the drum 10 starts to rotate in the direction indicated by the arrow.

Figure 25:
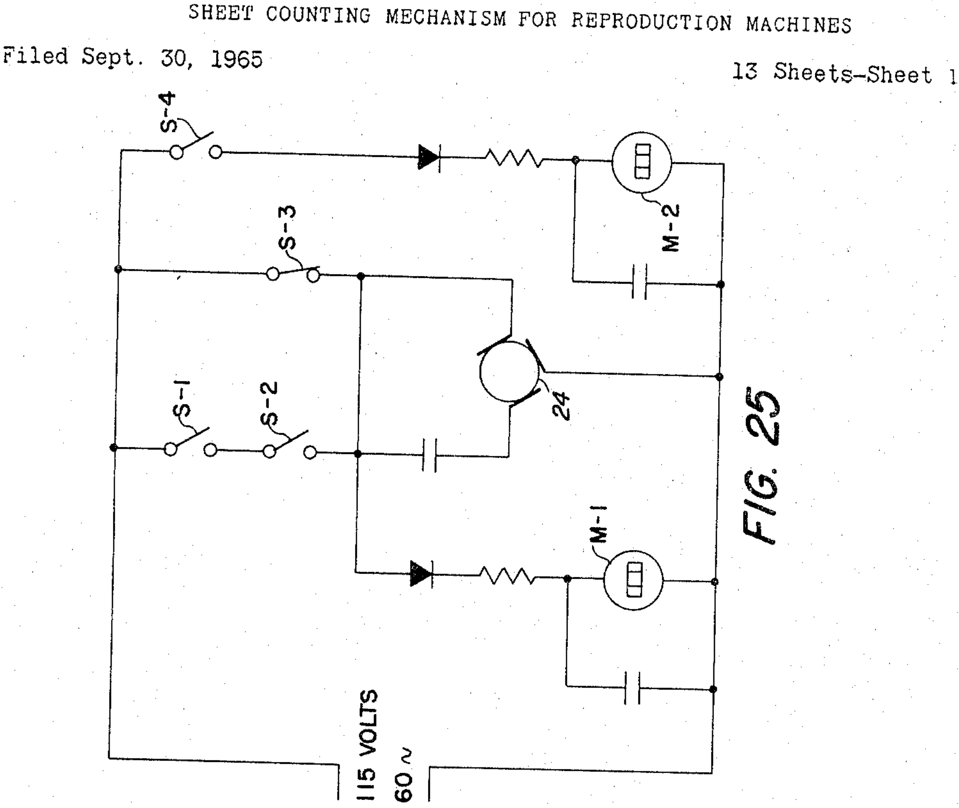
Figure 24:
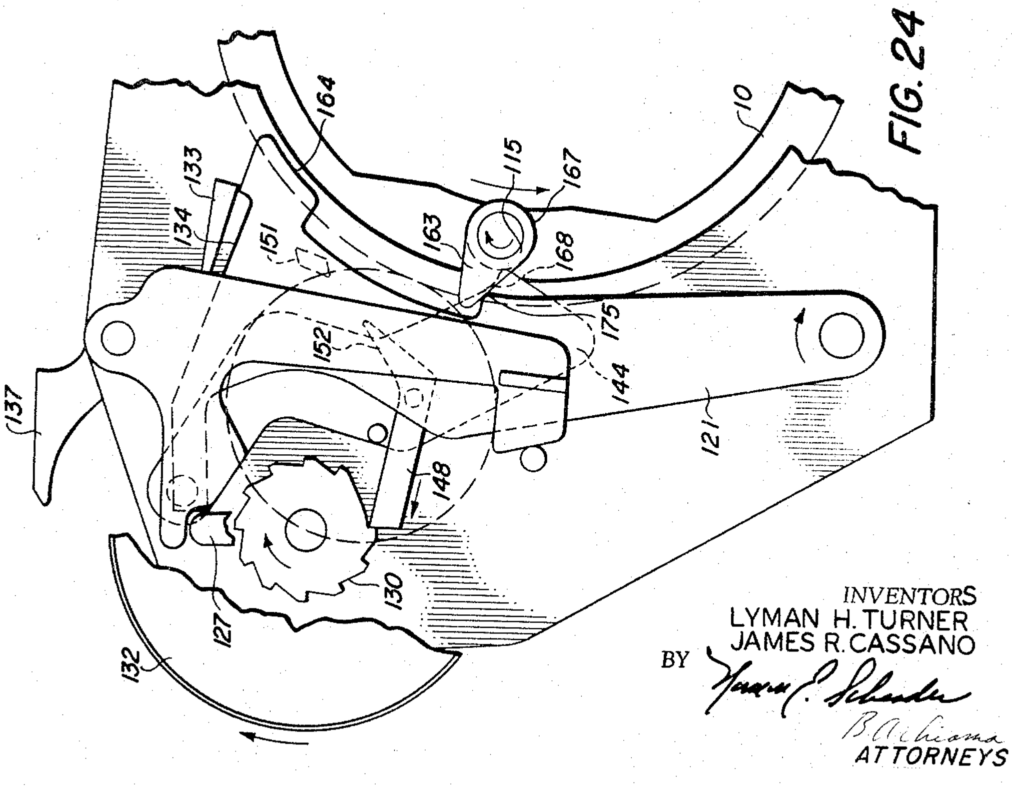

In the electrical diagram of FIG. 25, it is noted that the drive motor 24 is connected in a parallel circuit whereby the closing of the switches S–1 and S–2 or of switch S–3 only will energize the motor 24. The touch bar or start switch S–1 is normally open but is closed when the tab 154 on the lever 140 is moved against the switch actuator 153 as the touch bar is depressed. The home position switch S–3 is normally closed but is held open when the boss 156 is against the switch actuator 155. In the FIG. 19 condition of the programmer, both switches S–1 and S–3 are open, thereby maintaining the motor de-energized.

Figure 22:
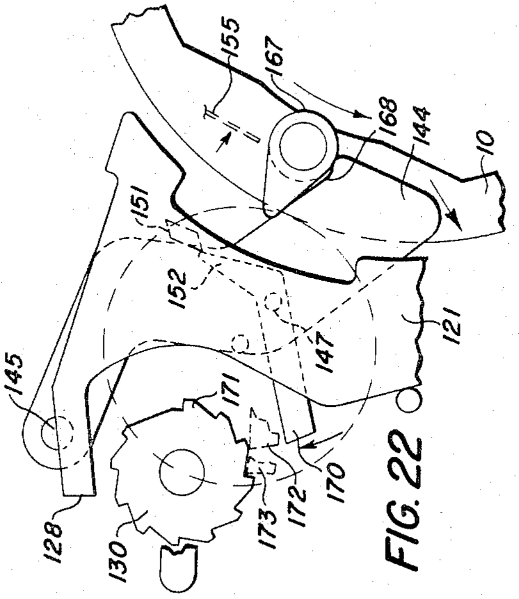
FIGS. 21, 22, 23 and 24 are schematic views of portions of the programmer mechanism shown in other positions of operation; and, FIG. 25 is an electrical diagram utilized in the disclosed reproduction machine.

When the touch bar 137 is depressed to close the start switch S–1, the motor becomes energized to produce rotation of the drum and movement of the program control actuator 115 downwardly. When it reaches a position, such as shown in FIG. 22 wherein the boss 156 is moved away from the switch actuator 155, the switch S–3 will close for maintaining energization of the motor 24; and the operator may then release the touch bar 137. Actually, this movement is so small and rather fast that the depressing action needed by the bar 137 is very slight and of short duration. As the touch bar is released, the lever 140 returns immediately to its initial position allowing opening of the start switch S–1.

Before the touch bar 137 is depressed to the position shown in FIG. 21, the rotation of the lever 121 to the left carried with it the latch stop 151 that depends from the lever 121 and which normally engages the projecting end 152 of the lever 148. With the pivot pin 147 remaining relatively stationary at this time, the movement of the latch stop 151 to the left along with the rotation of the lever 121 produces rotation of the latching lever 148 in a counterclockwise direction to the position shown in FIG. 21. For this phase of operation of the programming device 120, the latching lever 148, by this action, is carried slightly further from the teeth on the ratchet 130, such action only occurring once in a programmed production run. This action of the latch stop 151 upon the latching lever 148 only occurs in that portion of a production run which produces the transfer or master sheet; that is, to effect image transfer from the original typed sheet to a transfer sheet.

With the transfer sheet tabs 91 firmly clamped by the clamping devices 90 and with the start switch S–1 closed by the movement of the lever 140 in a counterclockwise direction, the drum 10 starts to rotate from the position indicated in FIG. 21. As previously stated, as the drum 10 starts to rotate, the control actuator 115 is carried therewith; and as it moves away from the switch actuator 155 to the position shown in FIG. 22, the switch S–3 is closed in order to maintain energization of the motor 24 to maintain continuous rotation of the drum 10 as the switch S–1 is again opened.

When the control actuator 115 reaches the adjacent end of the lever 144, a cam surface 167 on the control actuator 115 engages a cam surface 168 formed on the lever 144. This engagement produces rotation of the lever 144 in a clockwise direction about its pivot 145, as seen in FIG. 22. This action moves the pivot pin 147 for the latch lever 148 to the left. In so moving, the projecting end 152 is lowered and slides along the projection 151 by virtue of the spring 150 which normally maintains the end 152 against the latch stop 151. As the pin 147 moves to the left, as shown in FIG. 22, the latching corner 170 thereon is moving upwardly toward the teeth on the ratchet 130.

Figure 23:
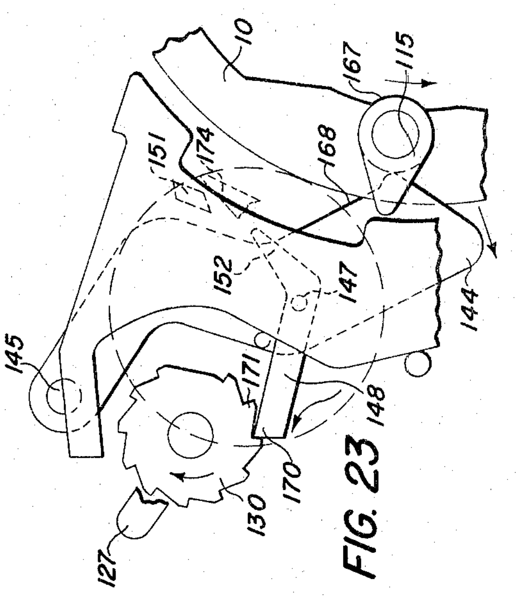

At about the time that the projecting end 152 is cleared of the rotative interference produced by the latch stop against the action of the spring 150 to rotate the latching lever 148, the latching end 170 strikes a tooth 171 on the ratchet 130, as shown by the dotted line 172 for the end 170. This striking of the end 170 with the tooth 171 stops further rotation of the lever 148, and continued movement of the pivot pin 147 to the left as the control actuator 115 continues its lowering movement produces movement of the latching end 170 along the tooth 171 until it reaches a position indicated by the dotted line 173 which is the extent or limit of movement for the latch end 170. In FIG. 23, the control actuator 115 is shown slipping past the end of the lever 144 at about the time that the end 170 of the latch lever reaches the position indicated by the dotted lines 173 in FIG. 22.

During this action, the latch lever 148 was unable to rotate the ratchet 130 since the latching end 170 engaged the part of a tooth 171 where it would be unable to be driven by the leftward movement of the end 170. When the cam 167 on the control actuator 115 has slipped past the cam surface 168 on the lever 144, the lever 144 is immediately rotated in a counterclockwise direction by the spring 146, to the position originally occupied by this lever, as shown in FIG. 19. This movement of the lever 144 returns the pivot pin 147 to its original position away from the ratchet 130 and to a position wherein the projecting end 152 is on the right side of the latch stop, as indicated by the dotted line 174 in FIG. 23.

The drum continues rotation until the control actuator 115 returns to its position, as indicated in FIG. 21, wherein the actuator 155 for the switch S–3 is contacted for opening the switch to thereby terminate the energization of the motor 24. In making this revolution, the transfer sheet T was clamped to the drum by action of the clamping devices 90. This transfer sheet remains on the drum since the clamping devices have not been actuated to unclamp the transfer sheet. During this rotation, the original sheet P is driven through the nip of the drum-pressure roller combination in order to transfer the image from the original sheet to the transfer sheet by the pressure-transfer process described above. The edge of the original sheet P, as it leaves the nip or in moving from the position indicated in FIG. 16 to the position shown in FIG. 17, is lifted off the drum 10 by the movement of the shoulder 85 outwardly relative to the periphery of the drum. The distance to which the edge of the sheet is moved is sufficient to enable the teeth 80 on the plow device 79 to extend below the edge and to strip the sheet as the same is driven out by the continued rotation of the drum. Since the shaft 114 maintains its position as shown in FIG. 18, the clamping tabs 110 remain clamped to the tabs 91 on the transfer sheet and, therefore, cannot be stripped off as the drum is rotated in this stage of operation.

It will be noted that during this stage of operation, that is, during the production of the transfer sheet T from the original sheet P, the latching lever 148 was prevented from rotating the ratchet 130 which would have rotated the knob 132 and changed the number setting originally set in the machine as indicative of the number of copies to be reproduced. This inability of the latching lever 148 to index the ratchet 130 was available by the use of the latch stop 151 in cooperation with the projecting end 152 and the relative positioning therebetween in order to enable the latch end 170 to strike the part of a tooth 171 on the ratchet that would not produce indexing thereof at this time. Once the projecting end 152 is on the right side of the latch stop 151, another and additional cycles of rotation of the lever 144 in a clockwise direction will produce indexing of the ratchet 130. This will be understood from a study of FIG. 23 which shows the first indexing of the ratchet 130 after the transfer sheet T has been produced during the previous rotation of the drum.

With the parts of the programmer in the position indicated in FIG. 21 but with the projecting end 152 of the latching lever 148 in the position 174 as shown in FIG. 23, the operator now inserts a sheet of copy paper P until the leading edge thereof is in registry with the register pins 83 as was for the case when the original sheet was inserted into the machine. The touch bar 137 is again depressed for rotating the level 140 in a counterclockwise direction to effect closing of the start switch S–1. This commences rotation of the drum 10 and movement of the control actuator 115 downwardly until the same becomes disengaged from the switch actuator 155 to cause closing of the home switch S–3 to maintain the rotation of the drum 10.

As the actuator 115 moves downwardly from the position shown in FIG. 21 to the position shown in FIG. 23, the pivot pin 147 is moved to the left along with the rotation of the lever 144; and since the projecting end 152 is on the right side of the now stationary latch stop 151, the resultant rotation of the lever 148 will cause the movement of the latching end 170 into engagement with a tooth 171 to cause clockwise rotation of the ratchet 130. Rotation of the ratchet 130 causes rotation of the knob 132 to effect the movement of numerals thereon from the indicated "3" to an indicated "2," showing that the first copy, as programmed, is being produced.

After the cam 167 on the control actuator 115 is free of the cam surface 168 on the lever 144, the latter is free to rotate in a counterclockwise direction to bring the pivot pin 147 back to its original position away from the ratchet 130 and to become conditioned for another movement and indexing of the ratchet. The actuator 115 continues around along with the rotation of the drum until the same arrives at the position shown in FIG. 21 again. As previously stated, when arriving at this position, the switch S–3 is opened to terminate energization of the motor 24. During this rotation of the drum, the first copy sheet P was stripped from the drum as it emerged from the nip between the drum and the roller 14 by action of the plow elements 80 acting upon the leading edge of the sheet P as it is forced upwardly by the outward movement of the register pins 83.

In order to produce the second programmed copy, the operator inserts a new copy sheet P into the machine as in the previous cycle and depresses the touch bar 137 again in order to effect another rotation of the drum 10 and the rotation of the lever 144 for producing indexing of the ratchet 130, as in the previous case. Each additional copy sheet is produced in this manner, that is, a new blank copy sheet is inserted in the machine and the touch bar 137 depressed to initiate action by the programming mechanism until the last copy is to be produced; and since three copies were initially programmed into the machine, this would be during the third copy operation of the programming mechanism.

During each indexing movement of the ratchet 130, the cam lobe 127 is moved in a clockwise direction a distance from one tooth 171 to another. Just prior to the time the touch bar 137 is to be depressed to produce the last copy, the cam lobe 127 is in a position nearly touching the cam surface 128 on the lever 121. In producing the last sheet, it is desirable that both the transfer sheet T and the last copy sheet P be stripped from the machine at the same time so that the last rotation of the drum to produce a copy will be the last rotation for a production run.

In depressing the bar 137 in order to effect closing of the switch S–1 to produce downward movement of the control actuator 115 as in the previous copy cycles, the indexing action performed by the latching lever 148 moves the cam lobe 127 into engagement with the cam surface 128 on the lever 121. As the lever 148 continues indexing or rotation of the ratchet 130, the lobe 127 drives the lever 121 in a clockwise direction as viewed in FIG. 24. This action has the effect of moving the projection latch stop 151 to the right and to move the cam surface 164 on the lever 121 into the circular path of movement of the cam 163 or that position occupied in FIG. 19. At the completion of the indexing action by the latching lever 148 which coincides with the release of the cam 167 from the cam surface 168, the projecting end 152 on the latching lever 148 is moved to the left side of the latch stop 151 as the lever 144 is rotated counterclockwise by its spring. This will lock the latching lever 148 in a position wherein it can no longer produce indexing of the ratchet 130.

In addition, the cam lobe 127 would have moved underneath the cam surface 142, thereby preventing further actuation of the touch bar 137 by the operator. With the lever 121 in its furthest position to the right, or that position assumed in FIG. 19, the latching element 133 will snap into its recess 134, thereby locking any tendency for the leftward movement of the lever 121. As the control actuator 115 continues its revolution about the axis of the drum and just before the lever 121 reaches its furthest position to the right, the cam 163 thereon engages a cam surface 175 formed on the lever 121 which, by this time, has nearly reached its limit of travel to the initial position of FIG. 19.

This engagement with the surface 175 as the cam 163 moves will cause small rotation of the control actuator 115 and thereby produce rotation of the clamping rod 114, which occurs when the clamping devices 90 are in the position shown in FIG. 17. Since the camming action of the flat surface 116 upon the edges 117 for the side plates 103, 104 is relatively large for the initial portion of the rotation of the shaft 114, the clamping tabs 110 and the inclined upper edges 106, 107 will be moved a sufficient distance to raise the tabs 91 to enable the plow elements 80 to slide underneath the tabs 91 on the transfer sheet T. Continued rotation of the drum 10 will cause stripping of both the transfer sheet T and the last copy sheet P.

When the cam 163 leaves the cam surface 175, the spring 118 will allow the clamping rod 114 to return to its original position reclosing the clamping tabs 110. During this rotation, the control actuator 115 is driven along in its circular path about the axis of the drum 10 and will arrive to its position as indicated in FIG. 19 wherein the switch actuator 155 will be actuated to open the circuit to the motor 24, and the cam 163 will engage the cam surface 164 to completely open the clamping elements 90 which will now be in the position indicated in FIG. 16 or the condition of the machine prior to the production run. The machine is now in condition for another complete production run, that is, in condition to accept and process sheets to produce a transfer sheet and any number of copies.

In the event that a preset number for copies has been dialed with the knob 132 and the operator wishes to produce a lesser number either at that time or during the production run initially started, this may be accomplished merely by rotating the dial 132 in the reverse direction to indicate the lesser number. This is possible because the latch element 148 does not interfere by engaging the ratchet 130, which engagement only occurs during an indexing action. However, in turning the dial to a lesser number, it cannot be turned to the "0" setting because of the obstruction provided by the lever 144 which would stop movement of the lobe 127 as it attempts to assume its "0" position. The lever 144 can only be moved out of the way by its rotation caused by the action of the cam 167 upon the surface 168. The number "1" position is the lowest to which the dial may be manually returned, thus requiring the production of at least one copy.

The reproduction machine is provided with a dual counting arrangement which is adapted to count the number of masters made on the machine for any length of time and also to count the copies produced during a particular time period separately from the master. In FIG. 25, a counter device M–2, which may be of any suitable type which records numerically in progression for each electrical impulse received, is shown connected to a source of electrical power and in series with a switch S–4. The switch S–4 is normally open and is actuated to a closed position when the lever 121 is rotated to the left at the beginning of a production run during the transfer sheet producing stage of the run. As previously stated, the lever 121 is rotated to the left, as viewed in FIG. 19, when the cam lobe 127 is moved out of the path of the cam surface 128 by the manipulation of the knob 132. Since this movement of the lever 121 only occurs once during the production cycle, its movement is utilized to close the switch S–4 in order to produce a single impulse for the master counter M–2.

In FIG. 25 a counter device M–1, similar to device M–2, is shown in series with the paper sensing switch S–2 and the push bar or start switch S–1. When a sheet of paper is inserted in the paper tray 60, the paper sensing switch S–2 closes, as previously described. For each actuation of the start switch S–1, which actuation is needed to produce each copy sheet inserted into the machine, the copy counter M–1 is actuated to indicate a count of the copies. As the machine is used throughout a time period, such as a day or a week, the counter M–2 will record cumulatively the number of masters produced for that period. Similarly, the counter M–1 will cumulatively record the number of copies, as distinguished from the master copy, that were produced during the same period.

From a study of the circuit of FIG. 25, it will be appreciated that the master counter M–1 will be actuated when a programmed production run is programmed into the machine which occurs when the copy setting knob 132 is rotated out of the "0" position. On the other hand, the copy counter M–1 is actuated every time that the motor 24 is energized, initially by closure of the start switch S–1 and then continuance of the energization by the closure of the home switch S–3, to produce a single rotation of the drum, which event occurs for the production of each copy of the production run.

While this invention has been described with reference to the structure disclosed herein, it is not confined to the details set forth; and this application is intended to cover such modifications or changes as may come within the purposes of the improvements or the scope of the following claims.

What is claimed is:

1. In a reproduction machine wherein an image is transferred from a master sheet to a copy sheet, the combination of a rotatable drum adapted for supporting the master sheet, means for rotatably supporting said drum, a circuit including a motor operatively connected to said drum for rotating the same when the motor is energized for producing movement of master and copy sheets, said circuit including a switching means operable when activated to close the circuit to said motor for controlling rotation of the drum, a control apparatus for sequentially controlling the activation of said switching means into successive operative steps, one step for each sheet to be moved by the drum, said control apparatus including means for converting each of said operative steps into one complete revolution of the drum wherein each revolution moves at least one complete sheet, means for presetting the number of operative steps to be exercised by said switching means and including a movable element movable in one direction from a starting position by incremental step amounts in accordance with the corresponding number of operative steps desired whereby the number of step amounts moved is equal to the number of sheets to be moved by the drum, connecting means for moving said movable element in the opposite direction an incremental step amount for each of at least some of the operative steps performed by said switching means, and means for preventing movement of said movable element in said opposite direction by said connecting means for the occurrence of the first of a series of preset operative steps and for permitting such movement thereafter for every succeeding operative step until the preset number of operative steps has been accomplished.

2. In a reproduction machine wherein an image is transferred from a master sheet to a copy sheet, the combination of a rotatable drum adapted for supporting the master sheet, means for rotatably supporting said drum, a circuit including a motor operatively connected to said drum for rotating the same when the motor is energized for producing movement of master and copy sheets, said circuit including a switching means operable when activated to close the circuit to said motor for controlling rotation of the drum, a control apparatus for sequentially controlling the activation of said switching means into successive operative steps, one step for each sheet to be moved by the drum, said control apparatus including means for converting each of said operative steps into one complete revolution of the drum wherein each revolution moves at least one complete sheet, means for presetting the number of operative steps to be exercised by said switching means and including a ratchet wheel rotatable in one direction from a starting position by incremental step amounts in accordance with the corresponding number of operative steps desired whereby the number of step amounts moved is equal to the number of sheets to be moved by the drum, connecting means for rotating said wheel in the opposite direction an incremental step amount for each of at least some of the operative steps performed by said switching means, and means for preventing rotation of said wheel in said opposite direction by said connecting means for the occurrence of the first of a series of preset operative steps and for permitting such rotation thereafter for every succeeding operative step until the preset number of operative steps has been accomplished.

3. In a reproduction machine wherein an image is transferred from a master sheet to a copy sheet, the combination of a rotatable drum adapted for supporting the master sheet, means for rotatably supporting said drum, a circuit including a motor operatively connected to said drum for rotating the same when the motor is energized for producing movement of master and copy sheets, said circuit including a switching means operable when activated to close the circuit to said motor for controlling rotation of the drum, a control apparatus for sequentially controlling the activation of said switching means into successive operative steps, one step for each sheet to be moved by the drum, said control apparatus including means for converting each of said operative steps into one complete revolution of the drum wherein each revolution moves at least one complete sheet, means for presetting the number of operative steps to be exercised by said switching means and including a ratchet wheel rotatable in one direction from a starting position by incremental step amounts in accordance with the corresponding number of operative steps desired whereby the number of step amounts moved is equal to the number of sheets to be moved by the drum, connecting means for rotating said wheel in the opposite direction an incremental step amount for each of at least some of the operative steps to be performed by said switching means, said connecting means inlcuding a latch element engageable with said wheel and being movable toward said wheel for rotating the same for each step to be performed, and means for diverting said latch element from movement toward said wheel for preventing rotation of said wheel in said opposite direction by said connecting means for the occurrence of the first of a series of preset operative steps and for permitting movement of the latch element into engagement with said wheel for every succeeding operative step thereafter until the preset number of operative steps has been accomplished.

References Cited

UNITED STATES PATENTS

| | | | |
|---|---|---|---|
| 2,133,630 | 10/1938 | Morrison | 101—245 XR |
| 2,558,157 | 6/1951 | Robinson | 101—132 |
| 3,207,897 | 9/1965 | Limberger | 101—409 XR |

ROBERT E. PULFREY, *Primary Examiner.*

E. S. BURR, *Assistant Examiner.*